United States Patent [19]

Schierbeek et al.

[11] Patent Number: 4,862,594
[45] Date of Patent: Sep. 5, 1989

[54] MAGNETIC COMPASS SYSTEM FOR A VEHICLE

[75] Inventors: Kenneth L. Schierbeek, Zeeland; Kenneth Schofield, Holland, both of Mich.

[73] Assignee: Donnelly Corporation, Holland, Mich.

[21] Appl. No.: 117,220

[22] Filed: Nov. 4, 1987

[51] Int. Cl.$^4$ ............................................. G01C 17/26
[52] U.S. Cl. ................................... 33/356; 33/363 K
[58] Field of Search .................... 33/357, 356, 363 R, 33/363 K; 250/231 SE

[56] References Cited

U.S. PATENT DOCUMENTS

| | | | |
|---|---|---|---|
| 2,944,157 | 7/1960 | McAuslan et al. | 250/231 SE |
| 3,746,842 | 7/1973 | Fowler | 33/363 K |
| 4,047,168 | 9/1977 | Fowler | 33/363 K |
| 4,095,348 | 6/1978 | Kramer | 33/363 K |
| 4,146,970 | 4/1979 | Edwards | 250/231 SE |
| 4,319,134 | 3/1982 | Weber | 250/231 SE |
| 4,328,463 | 5/1982 | Avins | 250/231 SE |
| 4,402,142 | 9/1983 | Dinsmore | 33/363 R |
| 4,414,754 | 11/1983 | Lapeyre | 33/363 K |
| 4,546,551 | 10/1985 | Franks | 33/356 |

Primary Examiner—Michael L. Gellner
Assistant Examiner—David M. Gray
Attorney, Agent, or Firm—Reising, Ethington, Barnard, Perry & Milton

[57] ABSTRACT

A compass and method of operation are disclosed for finding the heading of a vehicle. The heading is found using a compass having a rotor with a compass magnet thereon and means on the rotor defining a reference line in known relation with the polar axis of the magnet. The angular displacement of the rotor is measured between alignment with the direction reference axis and alignment with the local magnetic field. A search coil is used to torque the rotor so that it reaches a reference position in which the reference line thereon is aligned with the direction reference axis. A reference position encoder generates a pulse when alignment is achieved. An angular displacement encoder produces a digital signal which changes with each predetermined increment of rotation of the rotor and which is indicative of the direction of rotation. A microcomputer processes the signals to provide a cumulative count of the increments of rotation. The microcomputer adds a stored magnetic variation value to the cumulative count to provide an indication of true heading. A direction display is adapted to exhibit one direction symbol of a set of symbols for different vehicle headings with each symbol corresponding to a different range of counts in the cumulative count. The microcomputer converts the cumulative count to a different direction value for each different range and the display is changed when there is a change of direction value. The microcomputer provides a logical hysteresis to prevent the display from flashing between different symbols when the cumulative count is at a marginal value of a given range. The microcomputer also provides a time damping of the display by imposing a time delay before changing the display from one symbol to another.

29 Claims, 9 Drawing Sheets

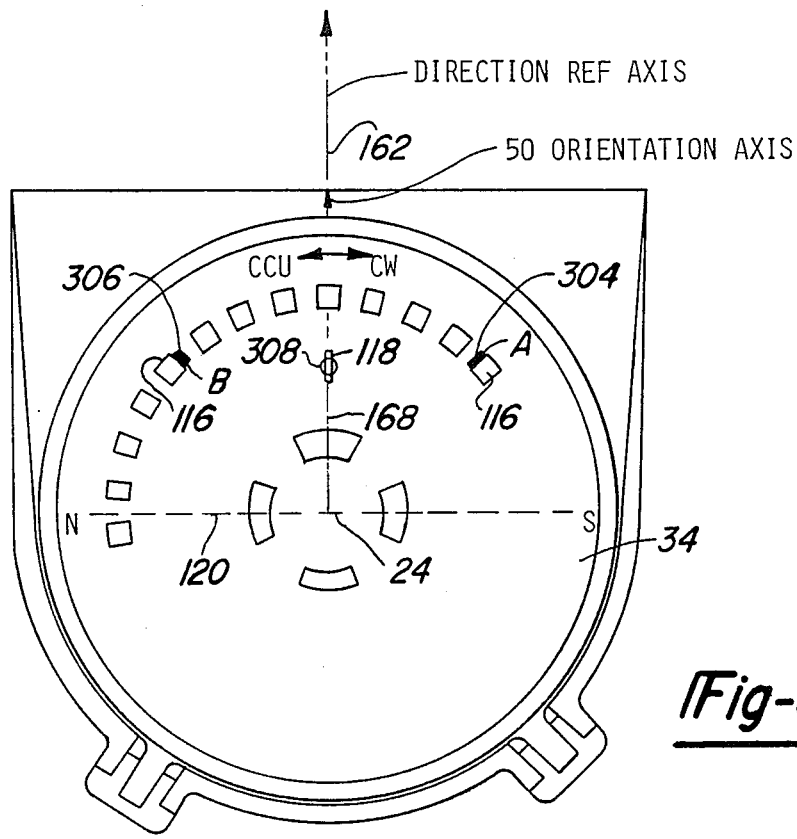
Fig-8
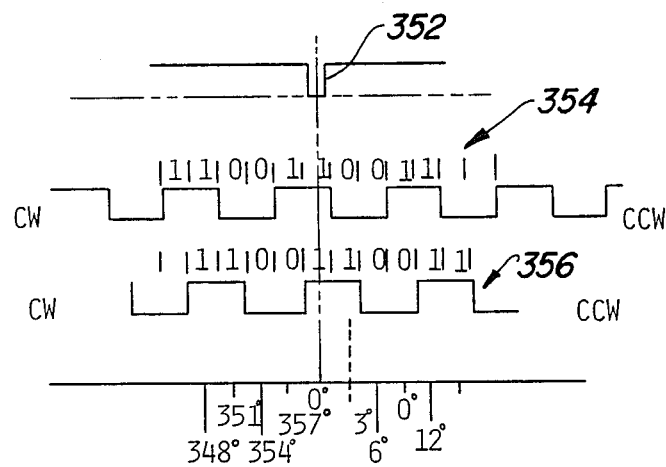
Fig-9
| COUNT | DEGREES | CCW | CW | DEGREES | COUNT |
|-------|---------|-----|-----|---------|-------|
| 120 | 268½-271½ | 1 1 | 1 1 | 268½-271½ | 0 |
| 119 | 265½-268½ | 0 1 | 1 0 | 271½-274½ | 1 |
| 118 | 262½-265½ | 0 0 | 0 0 | 274½-277½ | 2 |
| 117 | 259½-262½ | 1 0 | 0 1 | 277½-280½ | 3 |
| . | . | 1 1 | 1 1 | . | . |
Fig-10

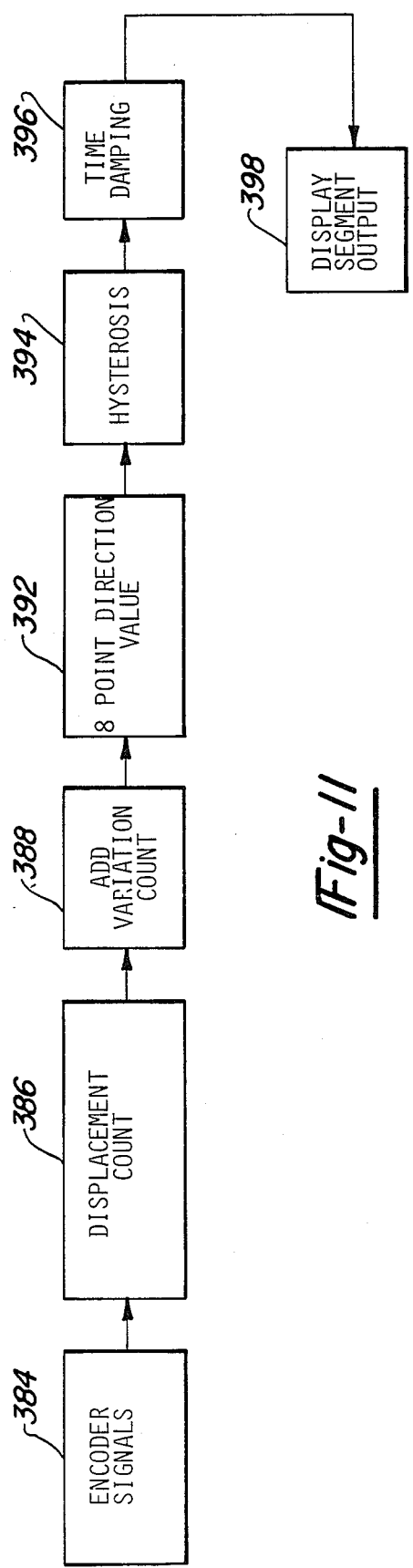
Fig-11
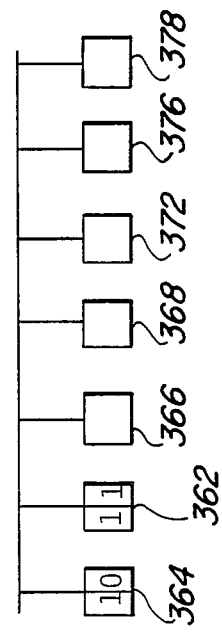
Fig-12
| DISPLACEMENT COUNT | DIRECTION | VALUE |
|---|---|---|
| 113-119-0-7 | W | 0 |
| 8-22 | NW | 1 |
| 23-37 | N | 2 |
| 38-52 | NE | 3 |
| 53-67 | E | 4 |
| 68-82 | SE | 5 |
| 83-97 | S | 6 |
| 98-112 | SW | 7 |
Fig-13

| DISPLACEMENT COUNT | STATUS | | | | DIRECTION VALUE | | | | DISPLAY |
|---|---|---|---|---|---|---|---|---|---|
| 30 | 0 | - | 0 | 0 | 0 | 0 | 1 | 0 | STEADY |
| 31 | 0 | - | 1 | 0 | 0 | 0 | 1 | 0 | FLICKER |
| 32 | 0 | - | 0 | 1 | 0 | 0 | 1 | 0 | FLASH |
| 33 | 0 | - | 0 | 1 | 0 | 0 | 1 | 0 | " |
| 34 | 0 | - | | | | | | | |
| 35 | 0 | - | | | | | | | |
| 36 | 0 | | | | | | | | |
| 57 | | | | | | | | | |
| 58 | 0 | - | 0 | 1 | | | | | FLASH |
| 59 | 0 | - | 1 | 0 | | | | | FLICKER |
| 60 | 0 | - | 0 | 0 | | | | | STEADY |
| 61 | 0 | - | 1 | 0 | | | | | FLICKER |
| 62 | 0 | - | 0 | 1 | | | | | FLASH |
| 63 | 0 | - | 0 | 1 | | | | | |

MAGNETIC COMPASS SYSTEM FOR A VEHICLE

FIELD OF THE INVENTION

This invention relates to the art of direction finding; more particularly, it relates to a magnetic compass system and a method of finding the heading of a vehicle.

BACKGROUND OF THE INVENTION

There is a need for an improved magnetic compass system especially adapted for use in vehicles, such as land vehicles and small boats, for the purpose of general orientation and for navigational purposes. Magnetic compasses for automotive vehicles are known in various forms. Typically, such compasses are of the type which utilize a compass card which carries the compass magnet and a direction indicator is provided thereon within the view of the vehicle driver. It is often desirable to install the compass per se, i.e. the magnetic field sensor and the compass display at separate locations in the vehicle.

A magnetic compass with a remote display especially adapted for automotive vehicles is disclosed in the Dinsmore U.S. Pat. No. 4,402,142 granted Sept. 6, 1983. The compass of this patent is provided with a Hall effect angular position encoder for producing electronic direction data signals. The remote display disclosed in the Dinsmore patent provides a heading read-out which is expressed in abbreviated notation for the compass points such as N, E, S and W for the cardinal points and NE, SE, SW and NW for the intercardinal or secondary compass points.

Another remote indicating magnetic compass for use in an automotive vehicle is disclosed in the Edwards U.S. Pat. No. 4,146,970 granted Apr. 3, 1979. According to this patent, the compass comprises an encoding wheel rotatably mounted within a housing on a pivot pin. A compass magnet is carried on the pivot pin. The encoding wheel is provided with code tracks each of which comprises a segment of light reflective surface and a segment of nonreflective surface. A set of four optical detectors are spaced circumferentially around the wheel to provide a digital signal which represents the angular position of the encoding wheel. The degree of resolution for determining the angular position is dependent upon the number of code tracks on the wheel.

The use of angular position encoders of the optical type in remote indicating compasses is well known. The Fowler U.S. Pat. No. 3,746,842 granted July 17, 1973 discloses a magnetic compass and an optical encoder for producing a digital signal representing an indication of direction. A rotor, in the form of a circular disk, is supported in a frame on a pivot pin which also carries a compass bar magnet. The circular card bears a coded mask and a photodetector generates a digitally coded signal corresponding to the position of the rotor with respect to the frame. The coded mask comprises a plurality of annular tracks of different radius. The tracks constitute a code representing angular position with each track comprising alternate light transparent and opaque sectors. The tracks are coded in a binary code such as the Gray code. In this coding, each individual track contributes one bit of a binary number and hence the degree of resolution of angular position is determined by the number of tracks. A separate photodetector is provided for each track and the set of detectors generates a digital electronic signal corresponding to angular position. Remote reading magnetic compasses utilizing optical position encoders of this type are also described in the Fowler U.S. Pat. No. 4,047,168 granted Sept. 6, 1977 and the Lapeyre U.S. Pat. No. 4,414,754 granted Nov. 15, 1983.

Optical shaft encoders which generate a digital signal representing the angular position of the shaft are known in various forms. A shaft position encoder is known in which a single code track is provided on a code disk and a pair of code element detectors is provided to generate out-of-phase pulses in response to the code elements The extent of angular displacement is determined by counting pulses and the direction of displacement is determined by the phase relationship of the pulses. Such an encoder is shown in the McAuslan et al U.S. Pat. No. 2,944,157 granted July 5, 1960. The Weber U.S. Pat. No. 4,319,134 granted Mar. 9, 1982 discloses an optical encoder for producing an electrical signal representative of the angular position and velocity of a rotatable shaft. This patent describes, as prior art, an optical encoder with a code disk having two annular tracks, one track having uniform distribution of slots and the other track having a single slot indicative of an index or home position. A pair of photodetectors coacting with the one track produce signals which are phase displaced in accordance with the direction of rotation of the shaft. An up/down counter produces an indication of the angular position of the shaft. The Avins U.S. Pat. No. 4,328,463 granted May 4, 1982 discloses an optical encoder for recording incremental changes. This patent describes, as prior art, an encoder in which an encoder disk has a row of apertures with a pair of photodetectors adapted to detect the apertures. The photodetectors are disposed relative to each other so that the signals produced thereby will be out-of-phase with each other. In this system, the digital signals generated by the detectors have four different permutations of logic levels within a single cycle Thus, the direction of rotation can be determined from a comparison of the current signal with the preceding signal.

Although magnetic compasses are well known which utilize angular position encoders for producing electronic direction signals for remote display, such compasses as are known in the prior art are not well adapted for use in automotive vehicles and small boats because of complexity, size and cost. A compass for such vehicles must be adapted for mass production at low cost and yet it must provide an accuracy consistent with the need for the vehicle navigation. The compass must be of rugged construction and reliable in operation and it must lend itself to mounting in a variety of locations in the vehicle. The compass i.e. the combined magnetic field sensor and the angular position encoder, should be of very small size.

A general object of this invention is to provide an improved method and apparatus for finding the heading of a vehicle.

SUMMARY OF THE INVENTION

In accordance with this invention, an improved method and apparatus for direction finding in a vehicle is provided using a magnetic compass. The direction finding is accomplished by turning the magnetic rotor of the compass between one angular position in which a reference line thereon is aligned with the direction reference axis of the vehicle and another angular position in which the polar axis of the rotor is aligned with the local magnetic field, the local field being that of the earth or the equivalent thereof in the locality of the compass. The angular value of the turning motion between the angular positions is measured and the value of the heading is obtained by adding or subtracting the measured angular value, depending upon the direction of the turning motion, to or from the angular value assigned to the magnetic north direction. Preferably, the measuring is performed during the turning of the rotor from the angular position in which the reference line is aligned with the direction reference axis to the angular position in which the polar axis is aligned with the local magnetic field. Preferably, for this purpose, the step of measuring during turning is preceded by the steps of first allowing the rotor to assume any arbitrary angular position relative to the direction reference axis and then turning the rotor relative to the direction reference axis through a sufficient angle to reach the angular position in which the reference line is aligned with the direction reference axis.

Further, according to this invention, the measuring step for determining the vehicle heading is accomplished with a compass having an orientation axis in alignment with the direction reference axis of the vehicle and having an angular displacement signal means for generating an electrical digital signal for each predetermined increment of motion of the rotor and indicating the direction of rotation and having a reference position signal means for generating a reference signal when the reference line is aligned with the direction reference axis. The increments of motion after the occurrence of the reference signal are algebraically added until the rotor settles into an angular position in which the polar axis is aligned with the local magnetic field. The algebraic summation represents the vehicle heading with reference to magnetic north.

Further, in accordance with this invention, the heading of a vehicle is determined with a compass which includes a search coil for applying a torque to the rotor to turn the rotor about its axis. The rotor is turned by energizing the search coil for applying torque to the rotor; after it reaches a reference position as signified by a reference signal, the coil is not energized.

Further, according to this invention, the heading of a vehicle is determined by a compass in which an angular position encoder comprises a set of code elements disposed on a rotor in a circumferential path and a pair of code element detectors mounted on the compass body. The detectors and code elements are adapted to produce an electrical binary signal in response to each increment of motion. The detectors are located relative to each other so that the pulses produced thereby are phase displaced from each other so that the binary signals have two logic bits with four different permutations of logic levels within a cycle. The direction of rotation is determined by comparing the current two-bit logic signal with the previous one. Cumulative displacement is obtained by incrementing a counter by one for each change of logic signal when the pulses from the detectors are phase displaced in one sense and by decrementing the counter when the pulses are phase displaced in the opposite sense. Preferably, the code elements on the rotor are optical elements and the detectors each comprise a photodetector. Further, each code element is preferably an aperture through the encoder disk and each of the detectors comprises an LED and a photodetector.

Further, in accordance with this invention, the magnetic heading of a vehicle is compensated for magnetic variation to provide a heading with reference to geographic north direction. This is accomplished by orienting the direction reference axis of the vehicle into alignment with the geographic north direction, allowing the polar axis of the rotor to become oriented with the local magnetic field so that the rotor reference line is at a predetermined angle with the magnetic north direction and measuring the angle between the reference line and the direction reference axis to obtain the value of magnetic variation.

Further, in accordance with this invention, a magnetic compass is compensated for variation to a high degree of accuracy by adjusting the current in a compensating coil until the desired display is achieved. This is accomplished by orienting the vehicle so that the direction reference axis is aligned with a selected magnetic direction, say magnetic east, south or west directions. The value of the angular displacement is measured between the direction of the reference line when it is aligned with the direction reference axis and the direction of the reference line when the polar axis of the rotor is aligned with the local magnetic field. A direction symbol of a set of symbols is displayed in accordance with the measured value of displacement, and the compensation current is adjusted until the display device displays the direction symbol corresponding to the selected one of the magnetic directions.

Further, in accordance with this invention, the vehicle heading is shown on a display with a different symbol for a predetermined number of different vehicle heading values, each symbol corresponding to a range of values corresponding to the cumulative count of the angular increments of displacement from a reference position. Preferably, the same heading symbol is retained in the display even when the cumulative count exceeds the range for that symbol by a certain number of counts and changing the display to another symbol only when the count exceeds such range by more than the certain number. Preferably also, the display is changed from one symbol to another only when the cumulative count changes and then remains unchanged for a predetermined time interval even though the count changes within that interval.

Further, in accordance with this invention, a compass is provided which is especially adapted for finding the heading of a vehicle and which is of compact design and of low cost. It is especially adapted for location remote from the compass display. This is accomplished by a compass having a rotor with a compass magnet thereon and means on the rotor defining a reference line having a predetermined angular position relative to the polar axis of the magnet. Means are provided for turning the rotor to one angular position in which the reference line is in alignment with the direction reference axis of the vehicle. Measuring means are provided for measuring the angular value of the displacement between the one angular position and another angular position in which the reference line is aligned with the local magnetic field. Further, means are provided for adding or subtracting the measured angular value, depending upon the direction of the turning motion, to or from the angular value assigned to the magnetic north direction. Preferably, means are provided for algebraically adding the value of the magnetic variation angle at the location of the vehicle to said measured angular value.

Further, in accordance with this invention, the compass is provided with a search coil for applying a torque to the rotor sufficient to rotate it until the reference line is aligned with the direction reference axis. An angular displacement encoder generates a digital signal which changes value for each successive predetermined increment of motion of said rotor and which is indicative of the direction of rotation. A reference position encoder generates a reference signal when the reference line is aligned with the direction reference axis. Means responsive to the digital signal algebraically adds the number of increments of motion after the occurrence of the reference signal to obtain a cumulative count when the rotor settles into an angular position in which the polar axis of the rotor is aligned with the local magnetic field.

Further, in accordance with this invention, the angular displacement encoder comprises a set of code elements on the rotor disposed in a circumferential path and a pair of code element sensors mounted on the compass frame. Each of the sensors is adapted to produce an electrical pulse in response to a code element and the sensors are located so that the pulses produced thereby are phase displaced from each other. The reference position encoder comprises a code element on the rotor and a sensor responsive to the reference code element which is aligned with the reference line. Preferably, the coded elements are optical elements on the rotor. Further, the rotor preferably comprises an encoder disk and each of the code elements is an aperture through the disk and each of the sensors comprises an LED and a photodetector.

Further, in accordance with the invention, means are provided for displaying one direction symbol of a set of symbols for different vehicle headings with each heading corresponding to a different range of counts in the cumulative count with a maximum cumulative count value corresponding to three hundred sixty degrees. Means are provided for changing the display from one symbol to another when the cumulative count changes from one range to another. Preferably, means are also provided for retaining the display of the one direction symbol until the cumulative count falls outside said one range by at least a predetermined number of counts.

Further, in accordance with this invention, means are provided for converting the cumulative count to a different direction value for each different range. Means are provided for changing the display from one symbol to another when the direction value changes. Preferably, means are provided to inhibit the change of the display from one symbol to another until the new direction value has remained unchanged for a predetermined time interval.

A more complete understanding of this invention may be obtained from the detailed description that follows taken with the accompanying drawings.

DESCRIPTION OF THE DRAWINGS

FIG. 8 shows a plan view of the optical encoder disk;

FIG. 9 is a diagram showing the relationship of the encoder signals;

FIG. 10 is a table showing the relationship of certain decoder binary signals and angular displacement values;

FIG. 11 is a functional block diagram illustrating the signal processing for producing a display of the vehicle heading;

FIG. 12 is a schematic representation of certain registers;

FIG. 13 is a table showing the ranges of displacement count for the corresponding heading direction symbols and values;

BEST MODE FOR CARRYING OUT THE INVENTION

Figure 1:
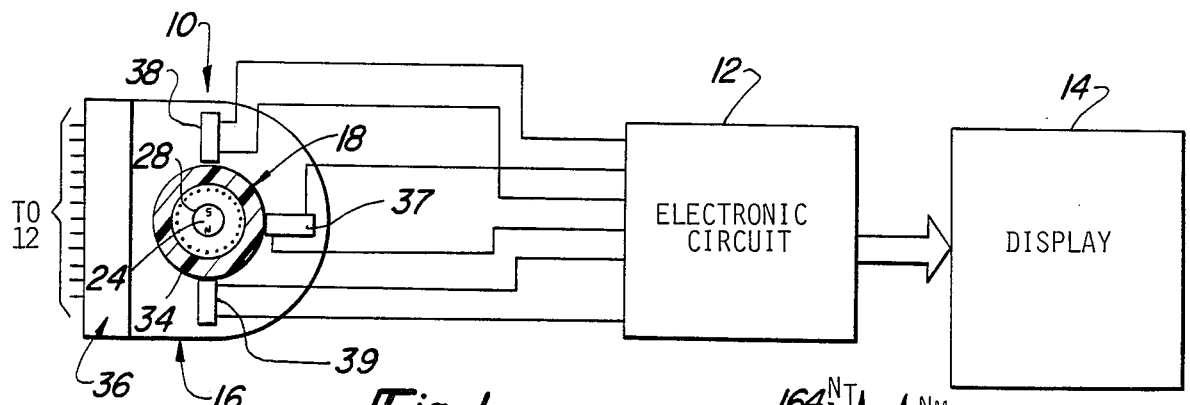
FIG. 1 is a block diagram representation showing the compass system of this invention.

Referring now to the drawings, there is shown an illustrative embodiment of the invention in a magnetic compass system with an optical position encoder. The compass is especially adapted for use in an automotive vehicle. It will be appreciated as the description proceeds that the invention is useful in other applications and may be realized in different embodiments.

General Description of the Compass System

Before describing the compass and the compass electronics in detail, it will be helpful to consider the general arrangement and the method of this invention for finding the heading of a vehicle. The term "heading" as used herein, means the direction of the fore and aft axis, or longitudinal axis of a vehicle relative to a reference direction such as magnetic north or geographic north. As used herein, the terms "geographic north" and "true north" both mean the direction of the pole star Polaris and the term "magnetic north" means the direction of the local magnetic field of the earth. The term "direction reference axis" means an axis having a predetermined angular relation with the fore and aft axis of the vehicle and may be parallel thereto.

In general, the compass of this invention has a rotor which carries a magnet which seeks to orient its polar axis with the local magnetic field which, for the present purpose, may be considered to have the same orientation as the earth's magnetic field and hence has the direction of magnetic north. According to this invention, the compass is provided with an angular position encoder which provides a direction data signal representing the angular displacement from some reference position or direction. The compass rotor is initially oriented in the reference direction and then the angular displacement of the rotor, either clockwise or counterclockwise, is measured by the encoder until it settles in alignment with the local magnetic field. The net displacement is taken as the heading angle indicated by the compass relative to the reference direction. This method of finding the vehicle heading by measurement of the relative displacement rather than obtaining a measurement in an absolute sense greatly simplifies the structure and the electronics of a vehicle compass.

FIG. 1 shows a compass system embodying the compass of this invention with the compass 10 shown in a bottom plan view partially in section. In general, the system comprises the compass 10, an electronic circuit 12 and a remote compass display 14. The compass 10, in general, comprises a support body 16 including a cylindrical cup 18 and a base 22. The cylindrical cup 18 has a longitudinally extending axis 24 and defines a chamber around the axis. A compass magnet 28 of cylindrical shape is radially polarized and is rotatable about the longitudinal axis 24. The compass magnet 28 is freely rotatable relative to the body 16 and, in the manner of a compass needle, it aligns itself with the local magnetic field. As is well known, the direction of the local magnetic field of the earth departs from true north by reason of variation due to the geographic location and by reason of deviation due to the influence of the environment of magnetic materials on the direction of the magnetic field. The angular position of the compass magnet is detected by an optical position encoder which comprises an encoder disk 34 which is mounted for rotation with the compass magnet 28. The encoder also comprises an optical transducer 36 coacting with the encoder disk 34. In order to compensate the local magnetic field for the effects of deviation a set of compensation coils 37 and 39 are provided. A search coil 38 is provided for a purpose which will be described subsequently. The optical transducer 36 coacting with the encoder disk 34 develops a direction data signal which is electrically coupled with the electronic circuit 12 which decodes the signals and develops a heading signal corresponding to the heading of the vehicle. The heading signal is applied by the electronic circuit 12 to the compass display 14 for visual presentation of the vehicle heading. The read-out of the display 14 may be expressed in degrees or it may be expressed in abbreviated notation for the compass points such as N, E, S and W for the cardinal points and NE, SE, SW and NW for the intercardinal or secondary compass points. The compass 10 will now be described in greater detail.

Detailed Description of the Compass

The compass 10 is shown in detail in FIGS. 3, 4, 5 and 6. The compass is adapted for mounting in the orientation shown in FIG. 4, i.e. the axis 24 is aligned in the vertical direction and the cup 18 is the bottom member of the compass. The compass 10 comprises, in general, a frame including a support body 16 and a cover plate 42 with a rotor 30 therein. The support body 16 includes a cylindrical cup 18 and a base 22. The cylindrical cup has a longitudinal axis 24 and defines a cavity around the axis. The rotor 30 carries a compass magnet 28 and is rotatably mounted by pivot pins 106 and 108 which are supported, respectively, in bearing elements 102 in the cup 18 and 136 in the cover plate 42. The compass also includes an optical position encoder which comprises an encoder disk 34 which is integral with the rotor 30 and it comprises an optical transducer 36. A pair of compensation coils 37 and 39 and a search coil 38 are mounted on the outside periphery of the cup 18 in successive ninety degree intervals and in close proximity with the compass magnet 28.

The support body 16 including the base 22 and the cup 18 is a unitary molded body of polymeric material such as nylon. The base 22 has a semicylindrical portion 46 and a flat upper surface on one side of the cup 18.

Figure 4:
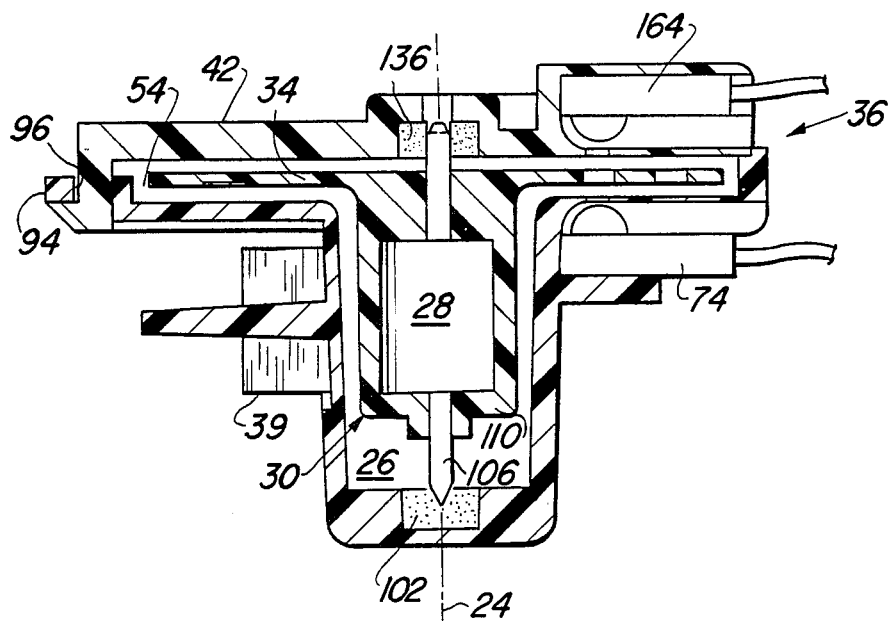
FIG. 4 is a cross-sectional view of the compass taken generally on lines 4—4 of FIG. 3.
Figure 6:
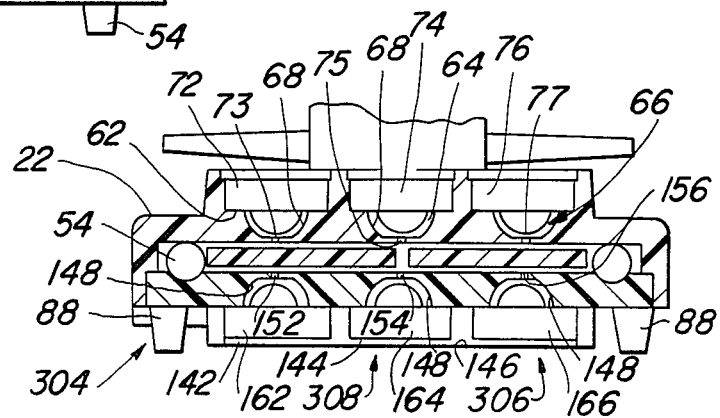
FIG. 6 is a view taken on lines 6—6 of FIG. 5.

The base 22 is formed with a rectangular portion 48 on the other side of the cup 18. This portion is provided with a pair of mounting studs 54 which are adapted to mate with mounting holes in the electrical connector 44 for support of the compass 10. The lower surface of the base 22, as shown in FIGS. 4 and 6, is provided with a cylindrical recess 54 for accommodating the encoder disk 34. The rectangular portion 48 of the base 22 also supports the phototransistors of the optical transducer 36.

Figure 5:
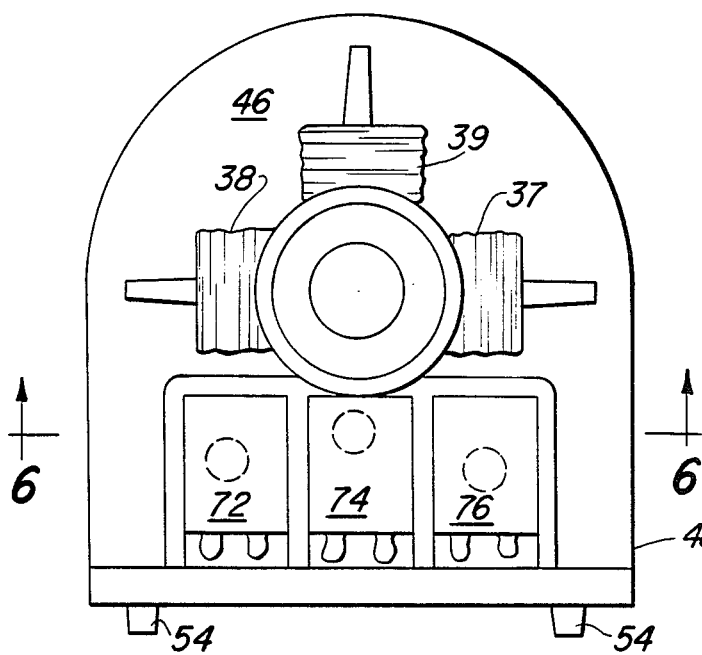
FIG. 5 is a bottom plan view of the compass body.

The optical transducer 36 comprises a pair of displacement sensors 304 and 306 and a reference position sensor 308. As such, the transducer includes plural sets of light emitting diodes (LEDs) and phototransistors in an arrangement which will be described subsequently. For the purpose of retaining three phototransistors, the base 22 is formed with three side-by-side compartments 62, 64 and 66. Each of these compartments has an interior wall configuration which conforms with the package configuration of a phototransistor; the wall configuration includes a channel 68 adapted to receive the lens of the phototransistor. The channel 68 of compartment 62 is provided with an aperture or slot 73 for phototransistor 72. Similarly, the channel of compartment 64 is provided with a slot 75 for phototransistor 74 and the channel of compartment 66 is provided with a slot 77 for phototransistor 76. As shown in FIGS. 5 and 6, the compartments 62, 64 and 66 receive phototransistors 72, 74 and 76, respectively. A pair of alignment pins 88 are formed on the lower surface of the base 22 and mate with alignment holes 93 on the cover 42. Base 22 is also formed with a pair of fastener openings 92 (only one shown in FIG. 3) at opposite locations on the rectangular portion 48. Also, the base 22 is formed with a pair of ears 94 extending from the semicircular portion 46. These ears 94 are provided with fastener openings 96. The openings 92 and 96 coact with the cover 42 in a manner to be described subsequently.

The cup 18 of the body 16, as previously described, is a hollow cylinder defining a chamber 26. The chamber 26 is adapted to enclose the compass magnet 28 and the end wall thereof is provided with the bearing element 102 for the upper end of the rotor 30. The cup 18 is also provided with a set of three coil support arms 104, 106 and 108 which support the respective compensating coils 37 and 39 and the search coil 38.

The rotor 30 comprises, in general, the encoder disk 34 and the compass magnet 28 which is held by a magnet holder 110. The encoder disk 34 and the magnet holder 110 are formed as a molded unitary body of a polymeric material. The rotor 30 is supported for rotation by the lower pivot pin 106 and the upper pivot pin 108. The compass magnet 28 is a cylindrical bipolar permanent magnet with radial polarization.

The encoder disk 34 is provided with a single code track 114 of optical apertures 116 for providing angular displacement information. The apertures 116 are equally spaced and, in the illustrative example, there are thirty apertures in the track 114. In addition to the angular position encoder track 114, a reference position aperture 118 is provided at a predetermined angular location relative to the north/south or polar axis 120 of the compass magnet 28; in this illustrative embodiment it is centered on a line perpendicular to the north/south axis.

The cover plate 42 comprises a unitary molded cylindrical member which is adapted to fit in a snug relationship with the cylindrical recess 54 on the compass body 16. The cover plate 42 also is provided with the bearing element 136 in alignment with the bearing element 102 in the cup 18. A pair of flanges extend from the bottom of the cylindrical member and are provided with respective alignment holes which receive the alignment pins 88 of the support body 22 to hold the cover plate 42 in fixed angular relationship with the body 22. A set of four lock pins 128 are formed as part of the cover plate 42 and coact with the fastener openings 92 and 96 to retain the cover plate in place.

The cover plate 42 is formed with a set of three compartments 142, 144 and 146 each of which is adapted to retain an infrared light emitting diode (LED). Each compartment has a wall configuration which conforms to the package configuration of the LED. Each compartment is provided with a channel 148 which accommodates the lens of the LED. The cover plate 42 is formed with an aperture or slot 152 above the compartment 142 and in alignment with the slot 73. Similarly, the plate is formed with slots 154 and 156 which are located above the compartments 144 and 146, respectively, and are aligned with the slots 75 and 77. As will be described subsequently, the LEDs 162, 164 and 166 and the phototransistors 72, 74 and 76 are electrically connected with the electronic circuit 12.

The LED 164 and the phototransistor 74 comprise a reference position sensor 308 which produces a reference signal pulse when the encoder disk 34 is in an angular position such that the reference aperture 118 is in alignment with the apertures 75 and 154. The LED 162 and the phototransistor 72 comprise a first angular displacement sensor 304 and the LED 166 and phototransistor 76 comprise a second angular displacement sensor 306.

The compass frame comprising the body 16 and cover plate 42 has an orientation axis 50 which coincides with a line extending through the axis of rotor 30 and the slot 75 of the position sensor 308. This orientation axis 50 (see arrow FIG. 8) is perpendicular to the end of the rectangular position 48 of support body 16.

Method of Determining Vehicle Heading

Figure 2:
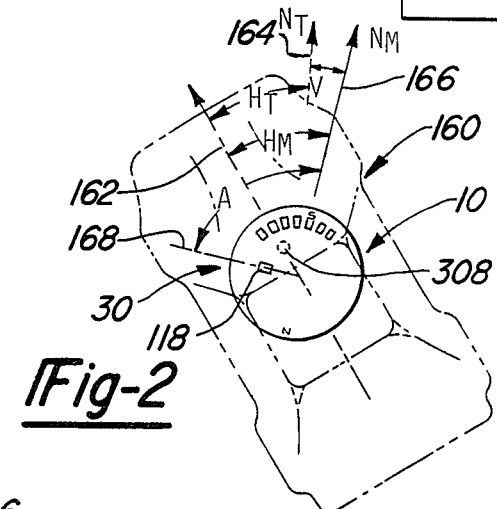
FIG. 2 is a diagrammatic representation of the compass installed in a vehicle.
Figure 3:
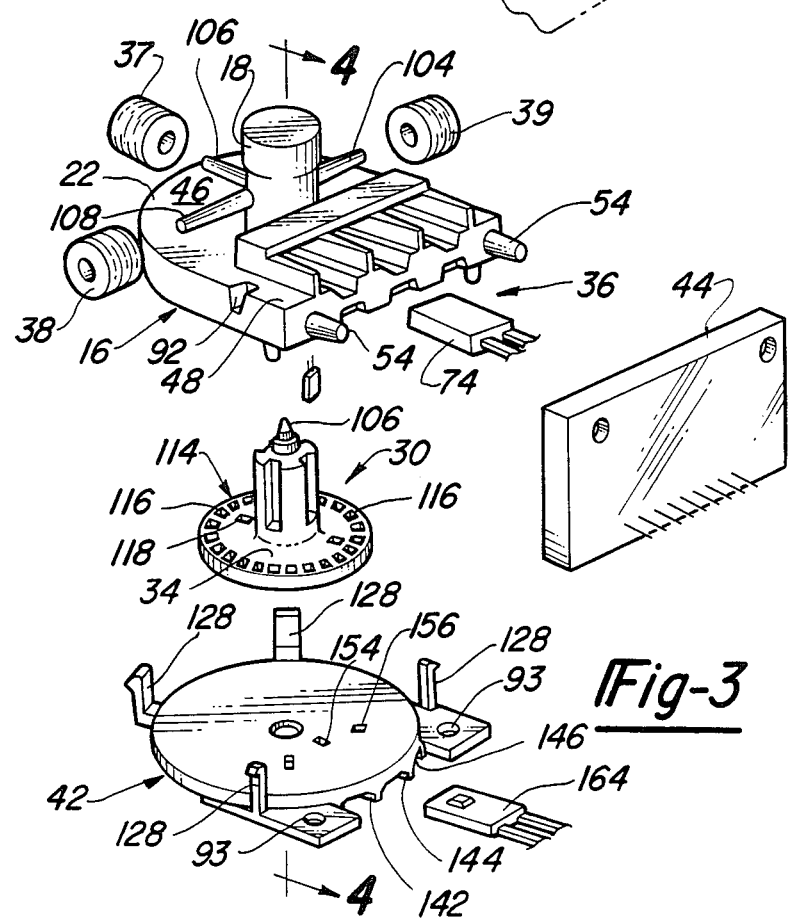
FIG. 3 is an exploded view of the compass including the optical position encoder.

Before describing the electronic circuit 12 of the compass system, the method of this invention for finding the heading of a vehicle will be described with reference to FIG. 2. FIG. 2 illustrates in phantom line, an automotive vehicle 160 having a direction reference axis (coinciding with its longitudinal axis) indicated by the dashed line arrow 162. The direction reference axis 162 represents the heading of the vehicle 160 and it is desired to determine such heading with reference to the true north direction indicated by the dashed line arrow 164. The vehicle 160 is equipped with a magnetic compass such as the compass 10 which includes a compass magnet on a rotor so that it seeks to orient the polar axis of the magnet with the direction of the local magnetic field. The compass 10 has its orientation axis 50 in alignment with the direction reference axis 162 of the vehicle. The magnetic compass installation in the vehicle is provided with deviation compensation, suitably by compensation coils, to provide a compensating magnetic field which offsets the influence of the magnetic environment. With deviation compensation, the local magnetic field in the vehicle 160 coincides in direction with magnetic north. The direction of magnetic north in FIG. 2 is indicated by the solid line arrow 166. As shown in FIG. 2, the polar axis of the rotor 30, as represented by a line between the N-S symbols is in alignment with the direction of magnetic north arrow 166. Thus, the heading of the vehicle 160 relative to magnetic north is represented by the angle $H_m$. As is well known, the direction of the local magnetic field of the earth departs from the direction of true north by a variation angle which is different in different geographic locations. As shown in FIG. 2, the variation angle between the directions of magnetic north and true north is represented by the angle V. Consequently, the heading of the vehicle 160 relative to true north is represented by the angle $H_t$ between the direction reference axis 162 and the true north direction which is indicated by the arrow 164. In order to determine the true heading $H_t$, it is necessary to first determine the magnetic heading and then algebraically add the variation angle V.

The magnetic heading $H_m$ is determined by measuring the angular displacement $H_m$ between the direction reference axis 162 and the polar axis of the rotor 30. For this purpose, a reference line 168 is defined by a line between the axis of rotation of the rotor 30 and the reference aperture 118 on the rotor. This reference line 168 is offset from the polar axis of the rotor by an offset angle A which is ninety degrees in the example of the illustrative embodiment. The offset angle A may be zero or any other value, depending upon the location of the reference position sensor 308 relative to the direction reference axis of the vehicle. In the example, the reference position sensor is on the direction reference axis. The rotor 30 is not provided, as in the prior art, with an absolute measurement scale, i.e. a measurement scale which can be read at discrete angular positions as an indication of the angular distance from a reference angle such as the reference line 168. Instead, the rotor is provided with a relative measurement scale, i.e. a scale which includes a plurality of discrete markers which are angularly displaced a predetermined distance from each other but which does not indicate the total angular displacement between any one of the markers and any given reference line or marker. In the illustrative embodiment, the relative angular measurement scale on the rotor comprises the plurality of apertures 116 which were described above.

With the relative measurement scale of the rotor 30, the magnetic heading $H_m$ is determined as follows. The essence of the method is that of turning the rotor between the angular position in which the reference line 168 is in alignment with the direction reference axis 162 and another angular position in which the polar axis of the rotor is aligned with the local magnetic field, i.e. magnetic north and measuring the angular value of the turning motion between these angular positions.

Preferably, the method is carried out by allowing the rotor 30 to assume an arbitrary angular position relative to the direction reference axis. Typically, this angular position would be that in which the reference line is aligned with magnetic north; however, the method allows for the possibility that the rotor may be in any angular position. Then, the rotor is turned from such arbitrary angular position relative to the direction reference axis through a sufficient angle for the reference aperture 118 to reach the reference position sensor 308 which, in the example, is aligned with the direction reference axis 162. This turning motion may be in either direction, clockwise or counterclockwise. (When the reference line 168 reaches or passes through alignment with the direction reference axis 162, the compass is said to be "initialized" since that alignment serves as the reference position for starting measurement of displacement relative thereto.) Then, the rotor is allowed to turn, under the influence of the local magnetic field, between the position in which the reference line is in alignment with the direction reference axis to the position in which the polar axis of the rotor is aligned with the local magnetic field. This turning motion may include some overshoot of the magnetic north direction and hence the rotor will settle into the magnetic north position after both clockwise and counterclockwise motion. The turning motion of the rotor from the direction reference axis position is measured on a continuous basis so that when it finally settles in alignment with the magnetic north direction, the net angular displacement, i.e. the combined clockwise and counterclockwise motion, represents the heading angle of the vehicle relative to magnetic north. When the turning motion is clockwise, the measured angular value plus the offset angle is added to zero degrees (value for magnetic north) to obtain the magnetic heading $H_m$. When the turning motion is counterclockwise, the measured angular value plus the offset angle is subtracted from three hundred sixty degrees (value for magnetic north) to obtain the magnetic heading $H_m$. The offset angle A is a negative value when the reference aperture 118 leads the north seeking pole of the polar axis of the compass rotor. The offset angle has a positive value when the reference aperture lags the north seeking pole.

This measurement of angular displacement may be obtained by various means. The preferred means according to this invention will be described in detail subsequently. If the measurement indicates a net clockwise angular displacement, it is added to the magnetic north direction of zero degrees. If the measurement indicates a net counterclockwise rotation, it is subtracted from the north direction of three hundred sixty degrees to obtain the magnetic heading. After the compass is initialized as described above, the vehicle heading is measured continuously relative to the reference position. After obtaining the magnetic heading, the true heading may be obtained by adding algebraically the variation angle V to the magnetic heading $H_m$. The value of the variation angle V is obtained by orienting the vehicle so that the direction reference axis is aligned with the true north direction and reading the measurement of the displacement between the direction reference axis 162 and the reference line 168. The variation compensation angle is either positive or negative depending upon whether the reference line 168 is displaced clockwise or counterclockwise from the direction reference axis 162 and hence, from the true north direction.

The Electronic Circuit

Figure 7:
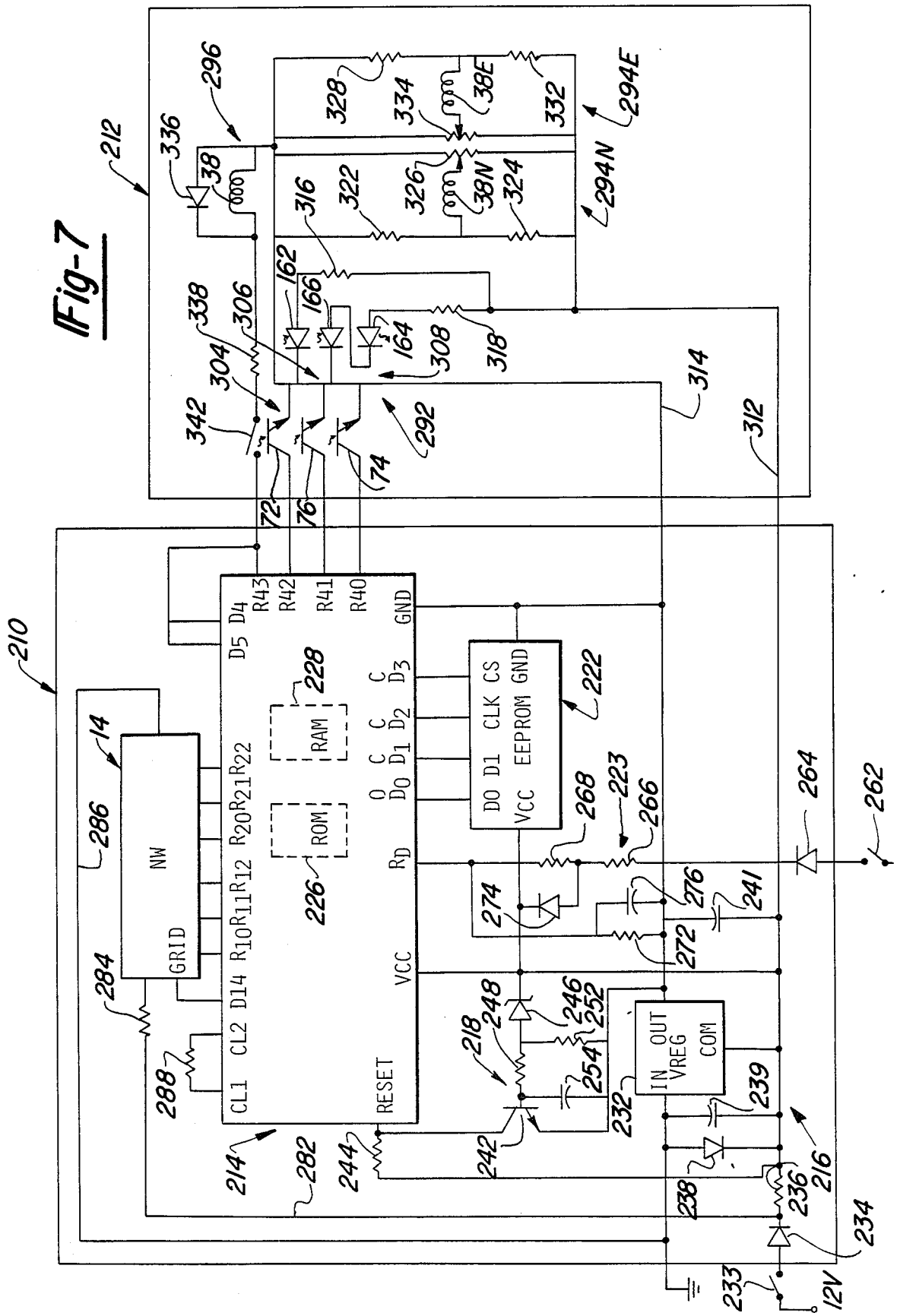
FIG. 7 is a schematic diagram of the electronic system of the compass.

The electronic circuit for the compass system will be described with reference to FIG. 7. The electronic circuit 12 comprises a signal processing circuit 210 and a compass sensor circuit 212. The sensor circuit 212 is located in the compass body and is electrically connected with the signal processing circuit 210 which is suitably disposed with the display 14 at a remote location in the vehicle. The signal processing circuit 210 includes a microcomputer 214. In addition, it comprises, in general, a power supply circuit 216, a reset circuit 218 for the microcomputer, and an electrically erasable programmable read-only memory (EEPROM) 222 for storing data to be utilized in the signal processing. The vehicle heading information display 14 is controlled by the microcomputer 214 and suitably takes the form of a vacuum fluorescent multi-segment alphabetic character display. The heading direction data signals are supplied from the sensor circuit 212 to the microcomputer 214. A dimming circuit 223 is provided for controlling the brightness of the display 14. The microcomputer includes a read-only memory (ROM) 226 for storing software including the operating program for the compass system. The microcomputer also includes a random access memory (RAM) 228 for use in performing calculations, for flags and registers and other functions required for signal processing. The microcomputer 224 is operative, under program control, to process the direction heading data signals from the sensor circuit 212 and to control the energization of the display 14 to indicate in abbreviated symbols, the heading of the vehicle.

The microcomputer 214, in the illustrative embodiment, is a Hitachi HMCS412C microcomputer available from Hitachi Corporation of Japan. The microcomputer receives a regulated supply voltage on pin VCC from the power supply circuit 216. This power supply circuit includes an integrated circuit voltage regulator including an input terminal connected to chassis ground and a common terminal connected with the B+ or battery supply voltage of the vehicle, suitably through the ignition switch 233 of the vehicle. The B+ voltage source is connected through a diode 234 for polarity protection and a resistor 236 to the common terminal of the regulator 232. A zener diode 238 is connected across the common terminal of the regulator 232 and ground for spike suppression and a filter capacitor 239 is connected in parallel with the zener diode. A filter capacitor 241 is connected between the output terminal and the common terminal of the voltage regulator 232. The common terminal of the voltage regulator 232 is connected directly with the voltage supply pin VCC of the microcomputer 214. The output terminal of the voltage regulator is connected directly with the ground pin Gnd of the microcomputer.

The reset circuit 218 includes an NPN transistor 242 connected between the reset pin of the microcomputer and the ground pin Gnd of the microcomputer. The reset pin is connected through a resistor 244 to the common terminal of the voltage regulator 232. This terminal is also connected through a zener diode 246 and a series resistor 248 to the base of the transistor 242. A resistor 252 is connected from the anode of zener diode 246 to the output terminal of the voltage regulator 232 and a capacitor 254 is connected between the base of the transistor 242 and the output terminal of the voltage regulator. The reset circuit 218 is operative to apply a momentary logic high signal to the reset pin each time the microcomputer is powered-up to reset the microcomputer circuits.

The EEPROM 222 is utilized for storage of certain data for use by the microcomputer 214. In particular, the value of the variation compensation is stored in the EEPROM. The voltage supply terminal VCC of the EEPROM is connected directly with the common terminal of the voltage regulator 232 and the ground terminal Gnd is connected directly with the output terminal of the voltage regulator. The data pins D0 and D1 of the EEPROM are connected directly with the correspondingly designated pins of the microcomputer. The clock pin CLK is connected directly with the pin D2 of the microcomputer and the pin CS of the EEPROM is connected directly with the pin D3 of the microcomputer.

The dimming circuit 223 is adapted to supply a logic signal to the microcomputer 214 for reducing the brightness of the display 14. For this purpose, parking light switch 262 of the vehicle is used for control of the logic signal so that when the parking lights are turned on the display is reduced in brightness. The parking light switch 262 is connected through a polarity protection diode 264 across a voltage divider circuit, including resistors 266, 268 and 272, to the reference potential at the output terminal of the voltage regulator 232. The pin $R_D$ on the microcomputer is connected with the junction of voltage divider resistors 268 and 272. A diode 274 is connected from the junction of resistors 266 and 268 to the common terminal of the voltage regulator 232. A capacitor 276 is connected in parallel with the resistor 272. When the switch 262 is closed, a logic high voltage is applied to the pin $R_D$ and the microcomputer 214 is effective to reduce the brightness of the display 224.

The display 14 is a vacuum fluorescent display of the multi-segment type for alphanumeric characters. Supply voltage for the display 224 is provided by the power supply 216. For this purpose, positive voltage is supplied through a conductor 282 and resistor 284 to the supply voltage terminal of the display and the chassis ground return terminal is connected through a conductor 286 to the ground terminal of the power supply. The six signal input terminals of the display 14 are connected respectively with output pins $R_{10}$, $R_{11}$, $R_{12}$, $R_{20}$, $R_{21}$ and $R_{22}$ of the microcomputer 214. The dimming control terminal of the display is connected with pin D14 of the microcomputer.

A resistor 288 is connected between the clock pins CL1 and CL2 of the microcomputer 214. The remaining pin connections for the microcomputer 214 will be described in conjunction with the compass sensor circuit 212 which will be described presently.

The compass sensor circuit 212, as mentioned above, is located in the housing of the compass 10. In general, it comprises an optical transducer circuit 292 (of optical transducer 36 of FIGS. 1 and 3), a pair of compensating coil circuits 294N and 294E and a search coil circuit 296.

The optical transducer circuit 292 comprises a pair of displacement sensors 304 and 306 and a reference position sensor 308. The displacement sensor 304 comprises the LED 162 and the phototransistor 72 which are optically coupled together as previously described. The displacement sensor 306 comprises the LED 166 and the photo transducer 76 which are optically coupled with each other. Similarly, the reference position sensor 308 comprises LED 164 and phototransistor 74 which are optically coupled, as previously described. The LEDs are energized continuously by the regulated voltage from regulator 232. For this purpose, the LED 162 is connected across the positive voltage supply line 312 and the reference voltage line 314 through a resistor 316. The LEDs 166 and 164 are connected in series with each other and with a resistor 318 across the supply lines 312 and 314. The phototransistors 72, 74 and 76 have their emitters connected with the reference voltage line 314 and their collectors connected respectively with the input pins R42, R41 and R40.

The compensating coil circuit 294N is adapted to provide a compensating magnetic field in the vicinity of the compass magnet 28 to provide north/south compensation for deviation. Similarly, the compensating coil circuit 294E is adapted to provide east/west deviation compensation. For this purpose, the north/south compensating coil 37 is connected in a bridge circuit comprising the voltage divider resistors 322 and 324 which are connected in series across the supply lines 312 and 314 and a north/south potentiometer 326 which is connected across the supply lines. The compensating coil 37 is connected between the junction of resistors 322 and 324 and the wiper contact of the potentiometer 326. In a similar manner, the east/west compensating coil 39 is connected in a bridge circuit comprising voltage divider resistors 328 and 332 and an east/west potentiometer 334. The potentiometers 326 and 334 are each provided with a thumbwheel to permit manual adjustment of the position of the wiper contact to adjust the strength of the compensating magnetic field produced by the respective coils 37 and 39. The manner in which compensation is adjusted for deviation will be described presently.

After the compass is first installed in a vehicle, it is compensated for deviation and variation. The compass is compensated for deviation in the following manner. The vehicle is oriented with its direction reference axis 162 pointed in the magnetic east direction. The compensation switch 342 is then opened which causes the microcomputer to operate in a programming mode which disables variation compensation so that the reading of the display is uncompensated for variation. With the compensation switch open, the deviation compensation circuit is operative and the thumbwheel of east/west potentiometer 334 is adjusted to obtain a display of "E" on the display 14. A special arrangement, as described below, is provided to aid the operator in making the thumbwheel adjustments to obtain a highly accurate compensation for deviation.

As shown in FIG. 13, a displacement count in the range of fifty-three to sixty-seven will cause the display to read "E". For the purpose of greater accuracy, it is desired to adjust the compensation current in the east/west compensation coil 39 so that the displacement count in the displacement count register is sixty which corresponds to a heading of true east with an accuracy of one displacement count. For this purpose, the microcomputer is adapted by means of its operating program to control the display in such a manner that the operator is apprised when the adjusted compensating current causes the displacement count to be equal to the value corresponding to true east. In the illustrative embodiment, the direction symbol on the display is caused to "flash" when the displacement count differs from the value for east by more than a predetermined number of counts, say one count. The direction symbol is caused to "flicker" if the displacement count is not greater than one count removed in either the clockwise or counterclockwise direction from the count value for east. When the displacement count is equal to the value for east, the direction symbol on the display is shown as a steady or unchanging intensity.

Figures 14, 17:
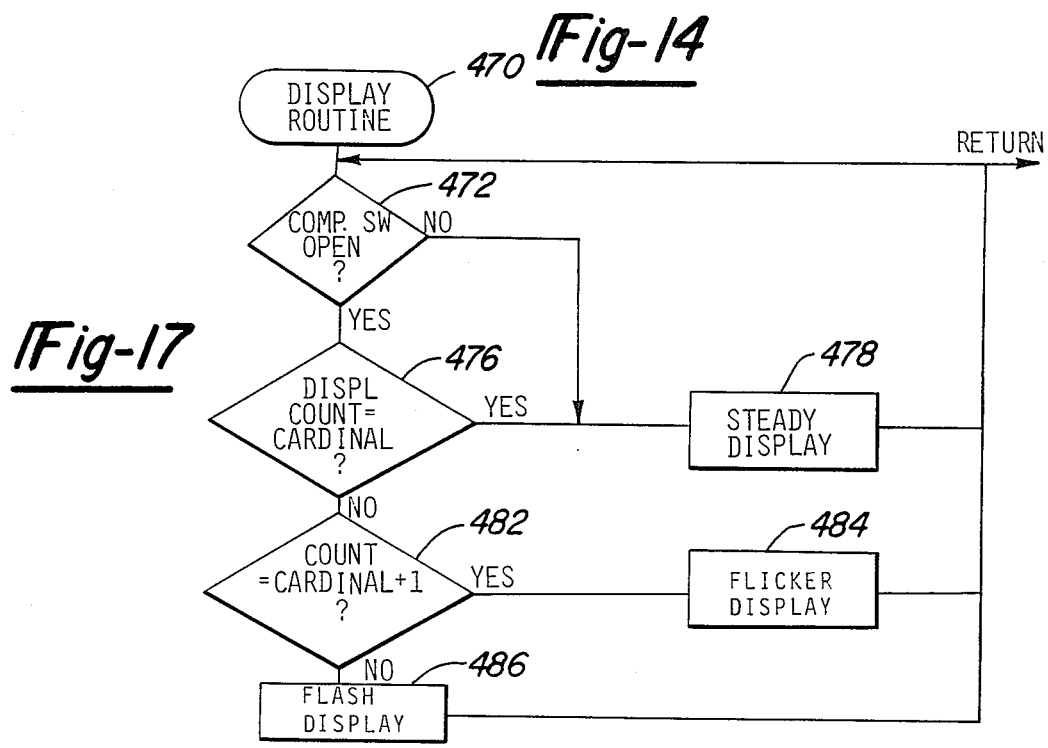
FIG. 14 represents a look-up table in the microcomputer memory.
FIG. 17 is a flow chart representing another part of the microcomputer program.

The aforementioned control system for use in obtaining accurate deviation compensation will now be described. In this description, the term "flashing" means that the direction symbol on the display is turned on and off in its entirety at a frequency which is readily perceivable. The term "flicker" means that one set of segments in the symbol on the display is turned on while another set of the segments is turned off and vice versa with alternate switching from on to off at a frequency which is readily perceivable to the operator and which allows the operator to distinguish one direction symbol from another. In order to control the direction symbol for flashing, flickering or steady intensity, a set of control bits are stored in the ROM of the microcomputer, one set of control bits for each displacement count. In the illustrative embodiment, there are one hundred twenty displacement counts numbered zero through one hundred nineteen and the displacement count value is used to address a corresponding number of locations in a look-up table 344 in the ROM, as represented in FIG. 14. An eight bit status word representing the control bits is stored at each address in the table. In each status word, the bits in bit positions three to four (counting left to right) are the flash control bit and the flicker control bit respectively. (Bit position one contains the hysteresis control bit, bit position two is unused and bit positions five through eight are the direction value bits.) For any of the one hundred twenty different displacement count values, the flash control bit will be in one binary state, say binary zero, when the displacement count differs from the count value for east by more than zero count, either clockwise or counterclockwise and the flicker control bit will be binary zero and this state causes the display to flash. When the displacement count is not more than one count removed from the count value for east, either clockwise or counterclockwise, the flash control bit will be in the logic zero state and the flicker control bit will be in the logic zero state which causes the direction symbol to flicker. When the displacement count is equal to the count value for east, both the flash control bit and the flicker control bit will be in the logic zero state and the direction symbol display will be shown at a steady intensity. Thus, by watching the display while adjusting the east/west knob, the operator can tell when the desired setting is being approached from either direction of rotation and tell when the exact setting is reached. As further illustrated in FIG. 14, the same flicker, flash and steady display is produced for each of the cardinal direction symbols.

The deviation compensation current adjustment for the north/south compensation coil 37 is obtained by orienting the vehicle with its directional reference axis pointing magnetic north and the procedure described above for east/west compensation is repeated using the north symbol on the display.

Then the vehicle is oriented with its direction reference axis pointed in the true north direction, and the variation angle V is measured. For this purpose, the compensation switch 342 is closed and the display control system for deviation compensation as just described is thereby disabled. When the switch 342 is closed, the heading of the vehicle, i.e. true north, is measured with reference to magnetic north by the compass and is therefore equal to the variation angle V for the geographical location of the vehicle. The heading angle is measured in terms of displacement count and is stored by the microcomputer as the variation count in the EEPROM. This places the compass in readiness for use in the vehicle.

The search coil circuit 296 includes the search coil 38 and a protective diode 336 in parallel therewith; it also comprises the series combination therewith of a resistor 338 and a compensation switch 342. This circuit is connected between the reference voltage supply line 314 on the one hand and the pins R43, D4 and D5 of the microcomputer 214, on the other hand. When the compass is first installed in a vehicle and is to be compensated for deviation, the switch 342 is opened and thus a logic signal is supplied to pin R43 which causes the microcomputer to produce a certain display for use in making the adjustment of the compensating coils 37 and 39. When the switch 342 is closed after compensation is completed, the search coil 38 is connected with the output pins D4 and D5. The microcomputer controls the energization of the search coil through the pins to turn the compass rotor to find the reference position, as will be described subsequently.

Operation of the Optical Encoder

The operation of the optical encoder will now be described with reference to FIGS. 8, 9 and 10. For purposes of explanation, it will be assumed that the encoder disk 34 is in an angular position such that the reference line 168 thereof is in alignment with the direction reference axis 162. The reference line 168 is merely a direction pointer, not a physical or structural line, and it is defined by the location of the reference aperture 118 relative to the axis of rotation 24 of the disk 34. With the encoder disk 34 in this position, the reference position sensor 308 produces a reference pulse which signifies that the encoder disk 34 is in its "home" or reference position. With the encoder disk in the reference position, the apertures 116 thereof are positioned relative to the displacement sensors 304 and 306 as indicated in FIG. 8. The code track 114 comprises a cyclically repeating pattern around the circumference of the disk 34 of alternate apertures 116 and opaque sectors of equal angular width. Thus, an aperture 116 and an adjoining opaque sector may be considered to be one cycle in the pattern. The sensors 304 and 306 have an optical beam width which is effectively one-half the angular width of each of the apertures 116 and hence, one-half the width of the opaque sector between adjacent apertures. With this relationship, the sensors 304 and 306 are spaced from each other an angular distance corresponding to an integral number of cycles plus one-fourth cycle. This spacing of the sensors results in the generation of a pulse train by sensor 304 which is phase displaced from the pulse train generated by the sensor 306. More particularly, the pulse train from sensor 304 will lag behind the pulse train from sensor 306 when the encoder disk 34 is rotated in the clockwise direction and it will lead the pulse train from sensor 306 when the disk is rotated in the counterclockwise direction. The phase difference is one quarter cycle. This phase displacement is indicative of the direction of rotation of the encoder disk.

FIG. 9 is a graphical representation of the pulse signals generated by the sensors 308, 304 and 306. In this graphical representation, the abscissa axis represents angular displacement of the encoder disk 34 and the ordinate axis represents relative signal amplitude from the respective sensors. For explanatory purposes the pulses of the pulse trains, as shown in FIG. 9, are idealized as rectangular pulses. The pulse trains 354 and 356 are each alternately high for one-half cycle and low for one-half cycle. The logical pulses are each one quarter cycle wide. The reference pulse 352 is at a logical low value or "0" when the encoder disk is in the reference position shown. The pulse train 354 produced by the displacement sensor 304 is at a logical high or "1" and the pulse train produced by the pulse train 356 produced by the sensor 306 is also at a logical high or "1" in the reference position of the encoder disk 34. When the encoder disk is rotated from the reference position in a clockwise direction, the displacement sensor 304 will produce logic signals, as represented by the pulse train 354, in the sequence of 1-1-0-0 as indicated by that notation on FIG. 9. When it is rotated in the counterclockwise direction, the logic signal will have the sequence of 1-0-0-1. At the same time, the sensor 306 will produce a logic signal having the sequence of 1-0-0-1 for clockwise rotation and the sequence of 1-1-0-0 for the counterclockwise direction. The displacement angle from zero degrees (or three hundred sixty degrees) is indicated on the lowermost abscissa axis of FIG. 9. The logic signals in the pulse trains 354 and 356 which are read simultaneously by the sensors 304 and 306 are combined as a pair, as shown in the table of FIG. 10, for each angular increment of displacement.

FIG. 10 shows the two bit logic signals produced by displacement sensors 304 and 306 as a function of angular position or displacement. For purposes of explanation, it will be assumed that the encoder disk 34 has been rotated by the search coil 38 to the reference position, as shown in FIG. 8. In this position, the logic signal is 1-1. When the search coil is no longer energized, the encoder disk will be free to rotate under the influence of the local magnetic field so that the north seeking pole thereof will become aligned with the magnetic north direction. With reference to FIG. 10, it is noted that the displacement count with the encoder disk in the reference position is taken as a value of one hundred twenty or a value of zero depending upon whether the rotation away from the reference position is in the clockwise or counterclockwise direction. It is further noted that with the encoder disk in the reference position, the angular position in degrees, as indicated in FIG. 10, is in the range of two hundred sixty-eight and one-half degrees to two hundred seventy-one and one-half degrees. This corresponds nominally with the direction of two hundred seventy degrees, it being further noted that this would be the magnetic heading indicated by the compass if the encoder disk remained in the reference position. This value of magnetic heading is obtained, as described above, by subtracting the offset angle A of ninety degrees from the measured angular value of three hundred sixty degrees (corresponding to a count of one hundred twenty). As indicated in FIG. 10, the logic signal will remain at 1-1 over an angular range of three degrees spanning from two hundred sixty-eight and one-half degrees to two hundred seventy-one and one-half degrees. If the encoder disk is rotated clockwise past two hundred seventy-one and one-half degrees, the logic signal will change to 1-0 and remain at that value until it reaches an angular displacement of two hundred seventy-four and one-half degrees. When the displacement angle reaches that value, the logic signal will change to 0-0 and remain at that value until angular displacement is two hundred seventy-seven and one-half degrees. At that value the signal will change to 0-1 and remains at that value until the angular displacement is two hundred eighty and one-half degrees. Then, the sequence of logic signal values is repeated. For counterclockwise motion, the sequence of values of the two bit logic signals is 1-1, 0-1, 0-0 and 1-0 as shown in the table of FIG. 10 for corresponding angular increments of displacement. This sequence of logic signal values is repeated for continued counterclockwise rotation. With the encoder disk 34 in any angular position, its direction of rotation from that position can be determined by comparing the two bit logic signal at its current value with the previous logic signal value. For example, with the encoder disk in the reference position, the logic signal is 1-1. If the next logic signal is 1-0 the rotation is clockwise and if it is 0-1 the rotation is counterclockwise. In the illustrative embodiment, there are thirty apertures 116 in the code track. This, as can be seen from the table of FIG. 10, provides for an angular resolution of three degrees. Consequently, the number of discrete angular positions which can be determined for the encoder disk 34 is one hundred twenty. Therefore, the angular displacement from the reference position may be designated by a number ranging from zero to one hundred nineteen with a different number for each three degree increment. The reference position is designated either as a count of zero or the equivalent count of one hundred twenty. The angular position measured from the reference position may be designated as the cumulative count of the changes in the two bit logic signal values, taking into account the direction of rotation as being either clockwise or counterclockwise. FIG. 10 shows in the clockwise displacement count column the cumulative count for each angular position for clockwise direction and the counterclockwise displacement count column shows the cumulative count for each position for counterclockwise rotation. Therefore by starting the count at zero or one hundred twenty and incrementing i by one for each change of logic signal value in the clockwise direction and decrementing it by one for each change in the counterclockwise direction, the net or cumulative count will represent the unique angular displacement or position of the encoder disk 34 relative to the reference position.

Operation of signal Processing Circuit

FIG. 11 shows a functional block diagram of the signal processing as performed by the circuit 210. For this purpose, the microcomputer 214 is provided with registers as shown in FIG. 12 for storing certain of the processing data. This includes a current value register 362 for holding the two bits of the displacement sensors 304 and 306. It also includes a previous value register 364 which holds the preceding values of the two bits from the displacement sensors 304 and 306. The displacement count register 366 holds the current position value, ranging from zero to one hundred nineteen, of the accumulative count of the displacement increments as discussed above. In addition, the microcomputer 214 is provided with several status flags or bits including clockwise direction flag 368 and an index search flag 372. Additionally, the microcomputer is provided with other registers including a compass register 376 and a display register 378.

In the signal processing, as represented by the block 384 of FIG. 11, data is supplied by the optical transducer circuit 292 to the microcomputer 214. This includes the two bit logic signal from the displacement sensors 304 and 306 and the reference or index logic bit from the reference position sensor 308. This data is processed by the microcomputer as indicated by block 386 to produce the displacement count in block 386. As discussed above, the displacement count, in the illustrative embodiment, has a value from zero to one hundred nineteen.

The variation angle V is represented by a value stored in the EEPROM 222 and is added by the microcomputer to the displacement count value, as indicated in block 388 to obtain a compensated count. The variation count is added to the displacement count by the microcomputer as indicated in block 388 of FIG. 11 to obtain a compensated count which represents the geographic or true heading of the vehicle.

The compensated heading count is converted to an eight point direction or compass value value by block 392. As discussed above, the heading of the vehicle, in the illustrative embodiment, is indicated on the display 14 in terms of the four cardinal points of the compass, namely N, E, S and W plus the four secondary points, namely NE, SE, SW and NW. These eight heading values are generally satisfactory for use in passenger cars and the like as an aid in roadway navigation and for general orientation. It will be understood that, of course, the display may be exhibited in terms of degrees of heading angle if more precise heading information is desired. As discussed above, the vehicle heading is indicated by the compensated count which may range from zero to one hundred nineteen. The value of the compensated heading count is converted to one of the eight compass points as shown in the table of FIG. 13. It is noted that each of the eight compass points covers a range of fifteen counts. West ranges from a count of one hundred thirteen through one hundred nineteen and from zero through seven. Northwest covers a range extending from a count of eight through twenty-two. Each of the compass points is assigned a decimal number from zero through seven as indicated in the table of FIG. 13. This conversion from compensated heading count to one of eight compass points is executed by block 392.

The compensated vehicle heading is shown on the compass display 14 in terms of one of the eight compass points, i.e. N, NE, E, SE, S, SW, W, or NW. It is desirable, however, to avoid having the display flash back and forth between one heading symbol and another as a result of only minor changes in vehicle heading. This would happen, for example, when the roadway direction changes slightly with the heading of the vehicle at a marginal value, such as that corresponding to a compensated heading count of fifty-two which is at the limiting value for the NE direction. A slight change of heading toward the E resulting in a count of fifty-three would call for the display to change from NE to E, unless special provision is made. To avoid undesirable flashing back and forth between direction symbols, logical hysteresis is added to the signal processing. The hysteresis block 394 of FIG. 11 requires that a change of at least two displacement counts at the input of block 394 before the output thereof is changed. The output signal is then applied to the time damping block 396.

The signal is processed by the time damping block 396 to avoid undesired change of the compass display due to a transient effect causing a momentary rotation of the compass rotor. For example, when a vehicle goes under a steel bridge the mass of steel affects the local magnetic field so that the compass rotor is turned momentarily as though the direction of the vehicle were changed. For the purpose of damping such a transient effect, the time damping block 396 is operative to hold the same signal output for a predetermined time interval after the input signal is changed. Thus, if the input value of four (south) changes to five (southwest) and remains at that value for say, ne and one-half seconds, the output value from block 396 will change to five after that time interval has lapsed. On the other hand, if the input value changes from four to five and back again to four within the time interval of one and one-half seconds, the output value of block 396 would remain unchanged at the value of four. The output signal from the time damping block 396 is applied to the input of the display segments output block 398. As mentioned above, the block 392 produces a compensated heading output signal having a value from zero to seven corresponding to the eight points of the compass. Block 398 receives the signal values from zero to seven and by means of a decoder generates the logic signals to selectively energize the segments of the display required to produce the compass point symbols such as N, NE, etc. corresponding to the values zero to seven.

Operation of the Compass System

The compass system, as just described, is controlled by the microcomputer 214 under program control. The operating program of the microcomputer is represented by the flow charts of FIGS. 15A, 15B, 16 and 17. The microcomputer program, which is stored in ROM 226, comprises a displacement decoding routine which is represented by the flow charts of FIGS. 15A and 15B taken together, a compass data processing routine represented by the flow chart of FIG. 16, and a display routine represented by the flow chart of FIG. 17.

The display routine 470 is used as an aid in compensating the compass for deviation and will be described with reference to FIG. 17. As discussed above, the compass is compensated for deviation after installation of the compass in the vehicle and before it is put into use. The display routine is executed when the compensation switch 342 is opened. In this routine, test block 472 determines whether the compensation switch is open and if it is not the program advances to block 478 which causes the symbol on the display to be displayed with steady intensity. If the switch is open, the program advances to test block 476 which determines, with reference to the look-up table 344, whether the displacement count is equal to a count value corresponding to one of the four cardinal directions. If it is, the direction symbol on the display 14 is displayed with steady intensity by the block 478. If it is not, the program advances from block 476 to block 482 which determines whether the count is equal to the cardinal count plus or minus one count, i.e. a count not more than one removed from the count corresponding to a cardinal direction. If it is, the program advances to the block 484 which sets the display 14 to display the direction symbol in a flickering mode. Then, the program loops back from block 484 to block 472. If at block 482 the answer is no, i.e. the displacement count is more than one count removed from a cardinal count, the program advances to block 486. This block causes the display 14 to show the direction symbol in a flashing mode. Then, the program loops back to test block 472.

Figure 15A:
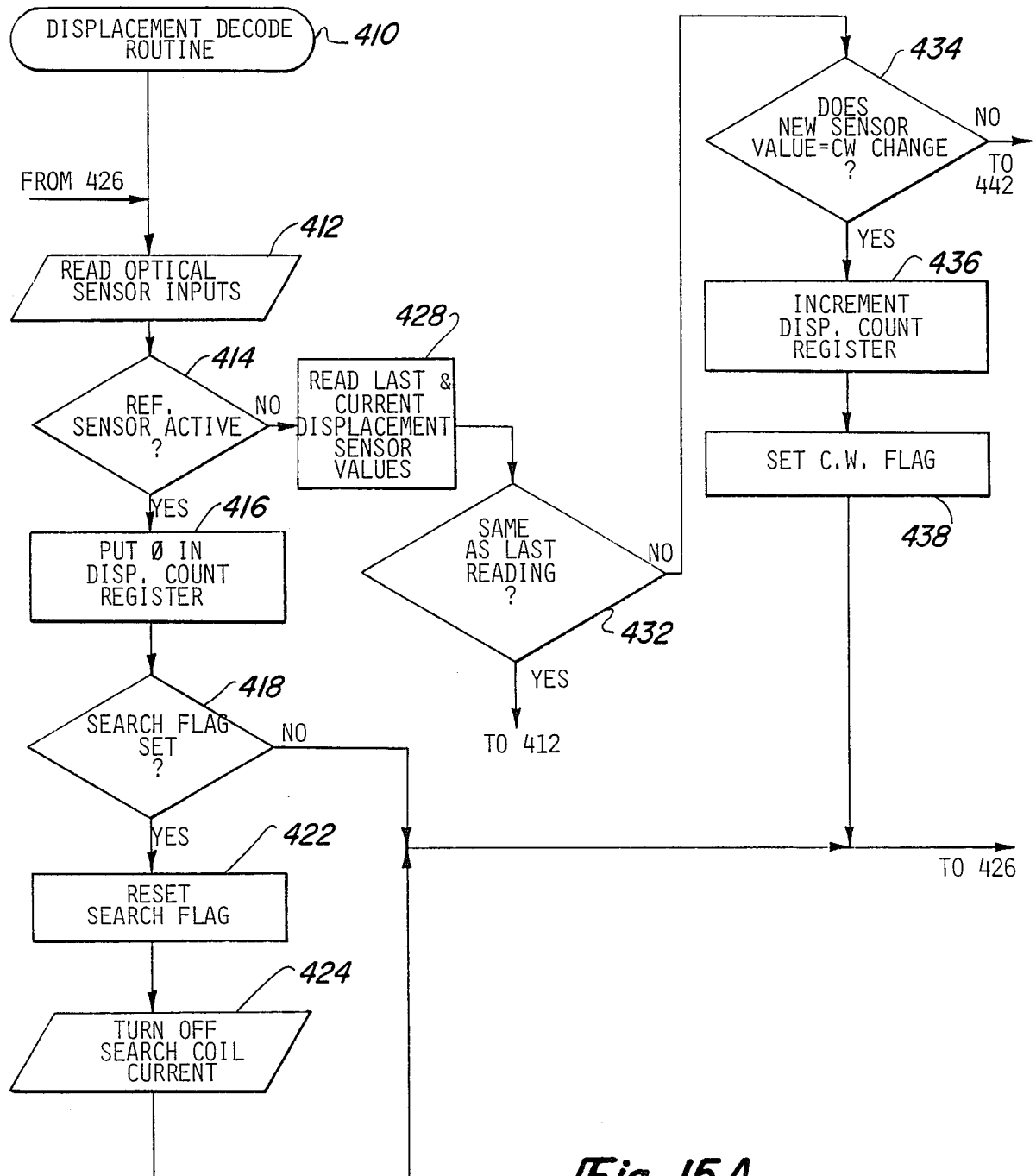
FIGS. 15A and 15B taken together constitute a flow chart representing a part of the program of the microcomputer.
Figure 15B:
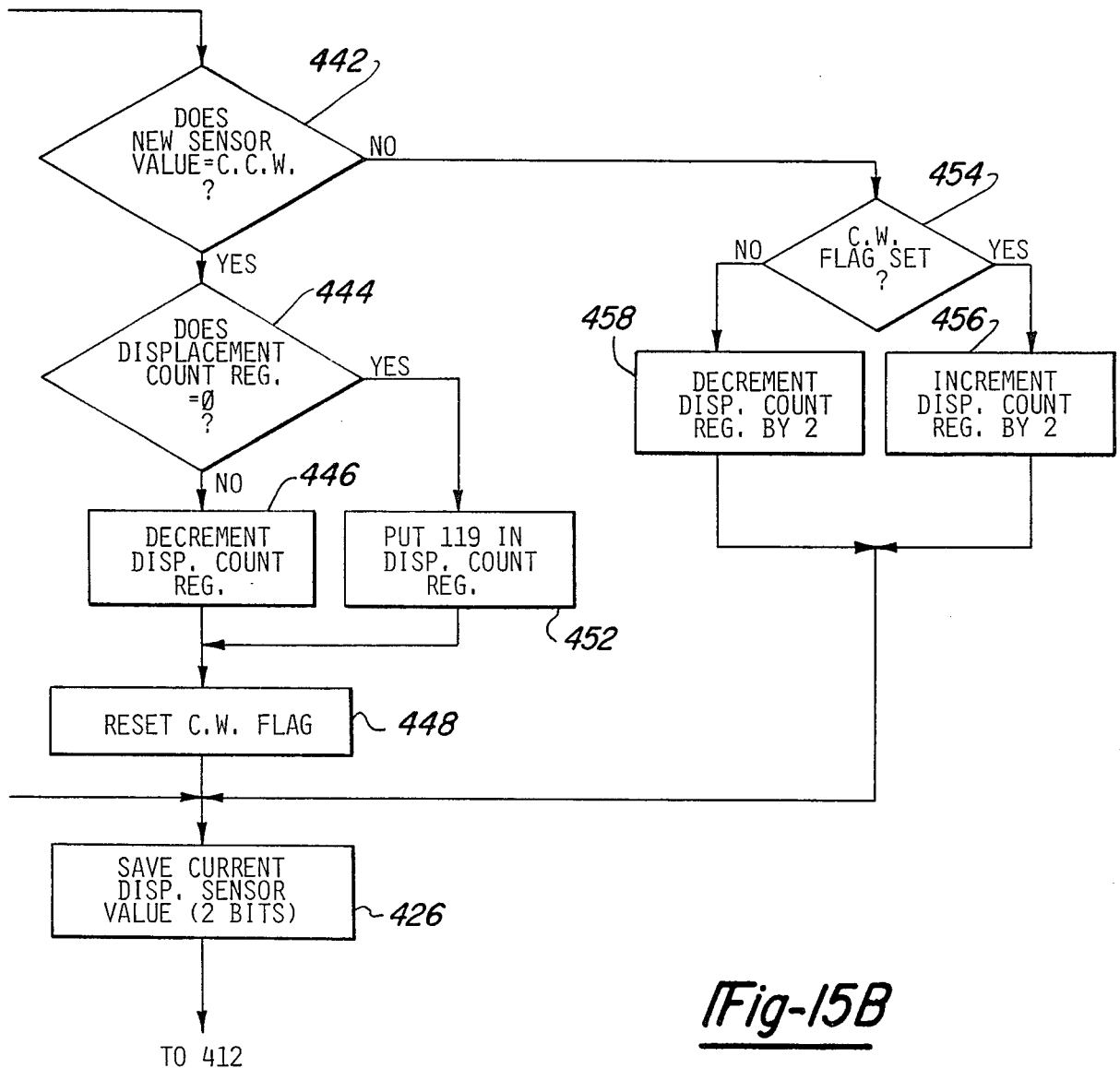

Referring now to the FIGS. 15A and 15B, the displacement decoding routine 410 will be described. This routine is executed as an interrupt service in the operating program of the microcomputer. The overall function is to determine the displacement count and load the current value into the displacement count register 366. The decoding routine is, of course, executed after the power-up routine of the microcomputer; each time the computer is powered-up, the control program sets the search flag 372 and it also loads the variation value from the EEPROM into the RAM of the microcomputer. During the interrupt cycle for execution of the decoding routine, the optical sensor inputs from the displacement sensors 304 and 306 and from the reference position sensor 308 are read into the microcomputer by the block 412. Then test block 414 determines whether the reference position sensor is active, i.e. whether the sensor 308 is aligned with aperture 118. If it is, the program advances to block 416 which puts a zero in the displacement count register 366. Then, test block 418 determines whether the search flag 372 is set. If it is, it is reset by block 422 and the program advances to block 424 which turns off the current to the search coil 38. (The search flag is set during the power-up routine and when the program cycles through the sequence of events to be executed it will execute a search when it comes to the search event if the flag is set. If the flag is not set, nothing is done in that time interval of the cycle. The search is executed by the microprocessor by pulsing the search coil 38 to cause the compass rotor to rotate the reference aperture 118 to the direction reference axis.) After the block 424, the program advances to block 426 which saves the current displacement sensor value in the register 362. From block 426, the program returns to block 412. If, in test block 418, it is determined that the search flag is not set, the program advances directly to block 426 which saves the current displacement sensor value in the register 362. Then the program loops back to block 412.

If the test block 414 determines that the reference sensor is not active, the program advances to block 428 which reads the previous displacement sensor value from register 364 and it reads the current displacement sensor value from register 362. Then the program advances to test block 432 which determines whether the current displacement sensor value is the same as the previous value. If it is, signifying that there is no change in the position of the compass rotor, the program returns to block 412. If, test block 432 determines that the current displacement sensor value is not the same as the previous value, the program advances to test block 434 which determines whether the current displacement value is indicative of a clockwise rotation of the compass rotor. If it is, the program advances to block 436 which increments the displacement count register 366. Then, block 438 sets the clockwise flag 368 and the program advances to block 426 which saves the displacement sensor value. Then, the program loops back to block 412.

If the test block 434 determines that the current sensor value does not indicate a clockwise rotation, the program advances to test block 442. This test block 442 determines whether the current sensor value indicates a counterclockwise rotation. If it does, the program advances to test block 444 which determines whether the displacement count register 366 equals zero. If it does not, the program advances to block 446 which decrements the position count register and then block 448 resets the clockwise flag 368. If the test block 444 determines that the displacement count register is equal to zero, the program advances to block 452 which puts the count of one hundred nineteen in the displacement count register. Then, block 448 resets the clockwise flag and the program advances to block 426 which saves the current displacement sensor value and the program loops back to 412.

If the test block 442 determines that the current displacement sensor value does not indicate counterclockwise rotation (after a previous determination that it does not indicate a clockwise rotation) then there is some error in the reading of the values and the program advances to test block 454 for error correction. In certain circumstances, if the rotor is rotating relatively fast, the sensors might miss reading of a value and pick up the succeeding value. It is assumed that such a speed would not be achieved if there is a reversal of rotation direction. Therefore, if the rotation continues in the previously determined direction it is assumed that a value was skipped and the next value was read. For this purpose, the block 454 determines whether the clockwise flag is set. If it is, indicating continued rotation in the same direction, the block 456 increments the displacement count register by two. If the clockwise flag is not set, the block 458 decrements the displacement count register by two. The program advances from either block 456 or 458 to the block 426 which saves the current displacement sensor value in the register 362 and the program loops back block 412.

The displacement decode routine 412 as just described is thus operative to maintain the displacement count register 366 loaded with a count corresponding to the position of the compass rotor.

Figure 16:
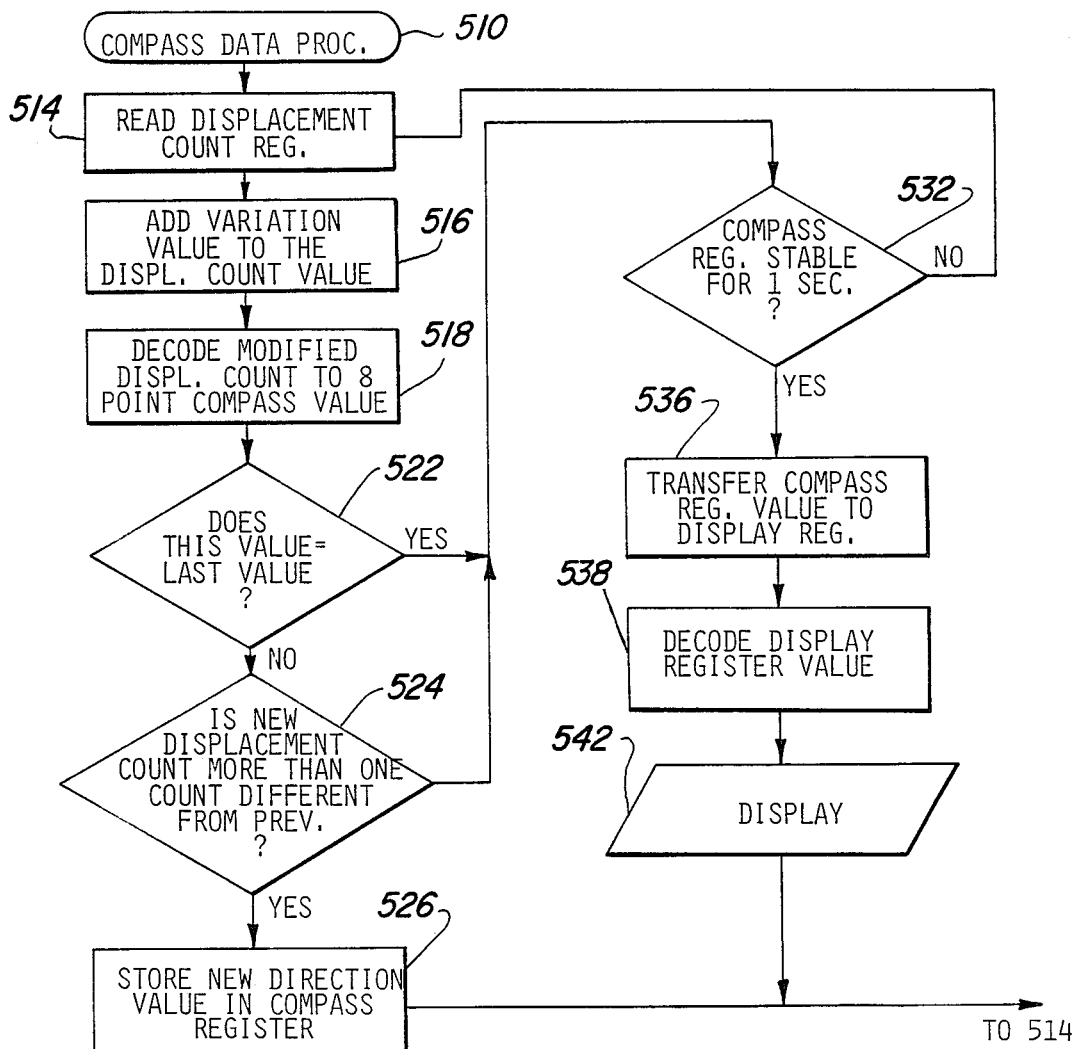
FIG. 16 is a flow chart representing another part of the microcomputer program.

The data processing subroutine 510 will now be described with reference to FIG. 16. The displacement count register 366 is read in block 514 and in block 516 the variation value from EEPROM 222 is added to the displacement count value. In block 518, the compensated count value is decoded to the eight point compass value. Then the program advances to a test block 522 which determines whether the current eight point compass value is equal to the last value. If it is not, the test block 524 determines whether the new count in the displacement count register 366 is changed by more than one count past the count corresponding to the marginal or change-over count from one direction value to another. (This is determined from the state of the hysteresis bit in the look-up table of FIG. 14.) If it is, the new eight point compass value is stored in the compass register 376 by block 526 and the program returns to block 514.

If test block 522 determines that the eight point compass value is equal to the last value the program advances to the test block 532. If not, but the answer to test block 524 is yes the program advances from that block to block 532. The test block 532 determines whether the compass register 376 is unchanged for more than a predetermined time interval, say one second. If it is not, the program returns to block 514. If, on the Other hand, test block 532 determines that the compass register 376 is unchanged for more than one second, the program advances to block 536. This block transfers the compass register value to the display register 378. The display register value is decoded by block 538 and block 542 displays the direction symbol, i.e. N, NE, et cetera on the compass display. Then, the program returns to block 514.

The compass data processing routine as just described is thus operative to maintain one of the eight direction symbols on the display 14 in accordance with the compensated displacement count to indicate the true heading of the vehicle.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. The method of finding the heading of a vehicle with a compass which includes a compass frame, a compass magnet on a rotor which is mounted for rotation on said frame so that it seeks to orient the polar axis of the magnet with the local magnetic field and which includes a reference line defined on the rotor having a predetermined offset angle, other than zero, relative to the polar axis of the magnet, said vehicle having a direction reference axis which has a known angular relation with the direction of the vehicle, said compass frame having an orientation axis extending perpendicular to the axis of rotation of said rotor, said method comprising the steps of:

fixedly mounting said compass frame on said vehicle with said orientation axis in a known angular direction relative to said direction reference axis, turning the rotor between one angular position in which the reference line is in alignment with the orientation axis and another angular position in which the polar axis of the rotor is aligned with the local magnetic field, measuring the angular value of the turning motion between said angular positions, and obtaining a value for said heading by adding or subtracting said angular value of turning motion, depending upon the direction of the turning motion, to or from the offset angle to obtain the vehicle heading with reference to the magnetic north direction.

2. The invention as defined in claim 1 wherein the step of measuring is performed during the turning of the rotor from said one angular position to said another angular position.

3. The method of finding the heading of a vehicle with a compass which includes a compass frame, a compass magnet on a rotor which is mounted for rotation on said frame so that it seeks to orient the polar axis of the magnet with the local magnetic field and which includes a reference line defined on the rotor having a predetermined offset angle, other than zero, relative to the polar axis of the magnet, said vehicle having a direction reference axis which has a known angular relation with the direction of the vehicle, said compass frame having an orientation axis extending perpendicular to the axis of rotation of said rotor, said method comprising the steps of:

fixedly mounting said compass frame on said vehicle with said orientation axis in a known angular direction relative to said direction reference axis, allowing the rotor to assume any arbitrary angular position relative to said orientation axis, turning the rotor through a sufficient angle so that said reference line reaches alignment with said orientation axis, allowing the polar axis of the rotor to become aligned with the local magnetic field so that the reference line is in a predetermined angular relation with the magnetic north direction, and measuring the value of the angular displacement between the direction of the reference line when it is aligned with the orientation axis and the direction of the reference line when the polar axis of the rotor is aligned with the magnetic north direction.

4. The method of measuring the value of magnetic variation for use in finding the heading of a vehicle with a compass which includes a compass frame, a compass magnet on a rotor which is mounted for rotation on said frame so that it seeks to orient the polar axis of the magnet with the local magnetic field and which includes a reference line defined on the rotor having a predetermined offset angle other than zero relative to the polar axis of the magnet, said vehicle having a direction reference axis which has a known angular relation with the direction of the vehicle, said compass frame having an orientation axis extending perpendicular to the axis of rotation of said rotor, said method comprising the steps of:

fixedly mounting said compass frame on said vehicle with said orientation axis in a known angular direction relative to said direction reference axis, orienting said vehicle so that the direction reference axis is in alignment with the true north direction, allowing the rotor to assume any arbitrary angular position relative to the direction reference axis, turning the rotor through a sufficient angle so that said reference line reaches alignment with said orientation axis, allowing the polar axis of the rotor to become aligned with the local magnetic field so that the reference line is in a predetermined angular relation with the magnetic north direction, and measuring the value of the angular displacement between the direction of the reference line when it is aligned with the orientation axis and the direction of the reference line when the polar axis of the rotor is aligned with the magnetic north direction, and obtaining a value for said magnetic variation by adding or subtracting said angular value of turning motion, depending upon the direction of the turning motion, to or from the offset angle to obtain the vehicle heading with reference to the magnetic north direction, whereby said angular displacement corresponds to the value of the magnetic variation angle at the location of said vehicle.

5. The invention as defined in claim 3 wherein said compass includes an angular displacement encoder for generating a digital signal which changes value for each successive predetermined increment of motion of said rotor and for indicating the direction of rotation thereof, and a reference position encoder for generating a reference signal when said reference line is aligned with said orientation axis, and wherein said measuring step includes:

counting the net number of changes of value of the digital signal after the occurrence of said reference signal to obtain a cumulative count when said rotor settles into an angular position in which the polar axis of the rotor is aligned with the local magnetic field, said cumulative count being the number obtained by adding one to a reference value assigned to one polar direction of the local magnetic field for each change occurring in one direction of rotation and subtracting one from said reference value for each change occurring in the other direction of rotation.

6. The invention as defined in claim 5 wherein said compass includes a search coil for applying a torque to said rotor, and wherein said step of turning the rotor comprises:

energizing said search coil for applying a torque to said rotor sufficient to rotate it until the reference line reaches the direction reference axis.

7. The invention as defined in claim 5 including the step of:

displaying one direction symbol of a set of symbols for different vehicle headings, each symbol corresponding to a different range of counts in said cumulative count, there being a maximum value of said cumulative count corresponding to three hundred sixty degrees.

8. The invention as defined in claim 7 including the steps of:
retaining the display of the same direction symbol when said cumulative count changes from one range to another range if said changed count does not fall outside said one range by at least a predetermined number of counts, and, if it does, changing the display to a symbol corresponding to said another range of counts.

9. The invention as defined in claim 5 including the step of:
displaying one symbol of a set of symbols for different vehicle headings, each symbol corresponding to a different range of counts in said cumulative count,
converting said cumulative count to a different direction value for each different range,
and changing the display from one symbol to another only when said direction value has not changed within a predetermined time interval.

10. The invention as defined in claim 7 including the step of:
displaying one symbol of a set of symbols for different vehicle headings, each symbol corresponding to a different range of counts in said cumulative count,
converting said cumulative count to a different direction value for each different range,
and changing the display from one symbol to another only when said direction value has not changed within a predetermined time interval.

11. The invention as defined in claim 8 including the step of:
displaying one symbol of a set of symbols for different vehicle headings, each symbol corresponding to a different range of counts in said cumulative count,
converting said cumulative count to a different direction value for each different range,
and changing the display from one symbol to another only when said direction value has not changed within a predetermined time interval.

12. The method of compensating a magnetic compass of a vehicle for magnetic deviation, said compass including a rotor mounted for rotation on a compass frame, said compass frame having an orientation axis in a known angular relation with the direction reference axis of the vehicle, a compass magnet on said rotor which seeks to orient the polar axis of the magnet with the local magnetic field, a reference line defined on the rotor having a predetermined angular position other than zero relative to the polar axis of the magnet, a compensation coil adjacent said rotor, said method comprising the steps of:
turning the rotor through a sufficient angle so that said reference line reaches alignment with said orientation axis,
allowing the polar axis of the rotor to become aligned with the local magnetic field,
measuring the value of the angular displacement between the direction of the reference line when it is aligned with the orientation axis and the direction of the reference line when the polar axis of the rotor is aligned with the local magnetic field,
displaying one direction symbol of a set of symbols for different vehicle headings on a display device in accordance with the measured value, there being a different symbol for each of a plurality of directions including said known deviation,
orienting said vehicle so that said direction reference axis is in alignment with a known direction with reference to magnetic north,
and adjusting the current through said compensation coil until said display device displays the direction symbol corresponding to the known direction.

13. The invention as defined in claim 12 wherein:
said compass also includes an angular displacement encoder for generating a digital signal which changes value for each successive predetermined increment of motion of said rotor and for indicating the direction of rotation thereof, and a reference position encoder for generating a reference signal when said reference line is aligned with said orientation axis, and wherein said measuring step includes:
counting the net number of changes of value of the digital signal after the occurrence of said reference signal to obtain a cumulative count when said rotor settles into an angular position in which the polar axis of the rotor is aligned with the local magnetic field, said cumulative count being the number obtained by adding one to a reference value assigned to one polar direction of the local magnetic field for each change occurring in one direction of rotation and subtracting one from said reference value for each change occurring in the other direction of rotation and wherein,
each of said symbols corresponds to a difference range of counts in said cumulative count, there being a maximum value of said cumulative count corresponding to three hundred sixty degrees and wherein said displaying step includes displaying the one of said symbols which corresponds with said cumulative count.

14. The invention as defined in claim 12 wherein said known direction is magnetic east and wherein said compensation coil is an east/west compensation coil and wherein said compass also includes a north/south compensation coil, said method comprising the additional steps of:
orienting said vehicle so that the direction reference axis is in alignment with the magnetic north direction,
allowing the polar axis of the rotor to become aligned with the local magnetic field,
and adjusting the current through said north/south compensation coil until said display device displays the direction symbol for north.

15. The invention as defined in claim 14 comprising the additional step of:
orienting said vehicle so that said direction reference axis is aligned with the true north direction,
whereby said value of angular displacement corresponds to the value of the magnetic variation angle at the location of said vehicle.

16. The invention as defined in claim 13 wherein:
said one of said symbols is displayed in a first mode when said cumulative count differs by more than a first amount from the count value corresponding to the known direction,
said one of said symbols is displayed in a second mode when said cumulative count differs by no more than said first amount from the count value corresponding to the known direction,
and said one of said symbols is displayed in a third mode when said cumulative count is not different from the count value corresponding to the known direction.

17. Apparatus for finding the heading of a vehicle having a direction reference axis which has a known angular relation with the direction of the vehicle, said apparatus comprising:
a compass which includes a compass frame, a compass magnet on a rotor which is mounted for rotation on said frame so that it seeks to orient the polar axis of the magnet with the local magnetic field,
said frame having an orientation axis extending perpendicular to the axis of rotation of said rotor, said compass frame being fixedly mounted on said vehicle with said orientation axis in a known angular direction relative to said direction reference axis,
means on said rotor defining a reference line having a predetermined offset angle other than zero relative to the polar axis of the magnet,
means for turning the rotor to one angular position in which the reference line is in alignment with said orientation axis,
means for measuring the angular value of the turning motion between said one angular position and another angular position in which said polar axis is aligned with the local magnetic field,
and means for adding or subtracting said angular value, depending upon the direction of the turning motion, to or from the offset angle to obtain the vehicle heading with reference to the magnetic north direction.

18. The invention as defined in claim 17 including:
means for algebraically adding the value of the magnetic variation angle at the location of said vehicle to said angular value.

19. The invention as defined in claim 17 wherein:
said compass includes a compass frame with said rotor mounted for rotation thereon, said frame having an orientation axis in alignment with the direction reference axis of said vehicle,
and a search coil for applying a torque to said rotor sufficient to rotate it until the reference line reaches the direction reference axis,
and wherein said means for measuring comprises:
an angular displacement encoder for generating a digital signal which changes value for each successive predetermined increment of motion of said rotor and which is indicative of the direction rotation thereof,
a reference position encoder for generating a reference signal when said reference line is aligned with said direction reference axis,
and means responsive to said digital signal for algebraically adding the number of increments of motion after the occurrence of said reference signal to obtain a cumulative count when said rotor settles into an angular position in which the polar axis of the rotor is aligned with the local magnetic field.

20. The invention as defined in claim 19 wherein:
said angular displacement encoder comprises a set of code elements on said rotor disposed in a circumferential path and a pair of code element sensors mounted on said compass frame, each of said sensors adapted to produce an electrical pulse in response to a code element, said sensors being located relative to each other so that the pulses produced thereby are phase displaced from each other,
said reference position encoder comprises a code element on said rotor and a sensor responsive to said reference code element, said reference code element being aligned with said reference line,
and said orientation axis extends radially through said reference position sensor and said axis of rotation of said rotor.

21. The invention as defined in claim 20 wherein said code elements are optical elements on said rotor and each of said sensors comprises a light source and a photodetector.

22. The invention as defined in claim 21 wherein said rotor comprises an encoder disk and each of said code elements is an aperture through said disk.

23. The invention as defined in claim 19 including:
means for storing a value corresponding to the magnetic variation angle at the location of said vehicle,
and means for algebraically adding said value of magnetic variation angle to said number of increments of motion to obtain the heading of said vehicle relative to the true north direction.

24. The invention as defined in claim 19 including:
means for displaying one direction symbol of a set of symbols for different vehicle headings, each symbol corresponding to a different range of counts in said cumulative count, there being a maximum value of said cumulative count corresponding to three hundred sixty degrees,
and means responsive to said cumulative count for changing the display when the cumulative count changes from one range to another range.

25. The invention as defined in claim 24 wherein said means responsive to said cumulative count is responsive only to a cumulative count which falls outside said one range by at least a predetermined number of counts.

26. The invention as defined in claim 19 including:
means for displaying one symbol of a set of symbols for different vehicle headings, each symbol corresponding to a different range of counts in said cumulative count,
means for converting said cumulative count to a different direction value for each different range,
and means for changing the display from one symbol to another in response to a change of said direction value.

27. The invention as defined in claim 26 including:
means for inhibiting said means for changing the display until the direction value has remained unchanged for a predetermined time interval.

28. The invention as defined in claim 24 including:
a compensation coil adjacent said rotor,
and means for adjusting the current through said coil until said display device displays the direction symbol corresponding to the direction heading of the vehicle,
whereby said compass may be compensated for deviation by orienting the vehicle so that the direction reference axis is in alignment with a known direction.

29. The invention as defined in claim 28 including:
means for modifying the display of said direction symbol to display said symbol in a first mode when the cumulative count differs by more than a first amount from the count value corresponding to the known direction and to display said symbol in a second mode when said cumulative count differs by no more than said first amount and to display said symbol in a third mode when said cumulative count equals the count value corresponding to the known direction.

* * * * *